(12) United States Patent
Kyono

(10) Patent No.: US 7,315,460 B2
(45) Date of Patent: Jan. 1, 2008

(54) SWITCHING POWER SUPPLY DEVICE

(75) Inventor: Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 11/417,153

(22) Filed: May 4, 2006

(65) Prior Publication Data
US 2006/0291117 A1 Dec. 28, 2006

(30) Foreign Application Priority Data
Jun. 23, 2005 (JP) ............ P2005-183622

(51) Int. Cl.
H02M 3/335 (2006.01)
(52) U.S. Cl. .......................... 363/16; 363/15
(58) Field of Classification Search ............. 363/15, 363/16, 131, 140
See application file for complete search history.

(56) References Cited

U.S. PATENT DOCUMENTS

| 4,692,851 | A * | 9/1987 | Attwood ............... 363/16 |
| 6,418,038 | B2 * | 7/2002 | Takahama et al. ....... 363/17 |
| 7,212,415 | B2 * | 5/2007 | Osaka ................. 363/21.02 |
| 7,242,595 | B2 * | 7/2007 | Yasumura ............. 363/21.02 |
| 2006/0098464 | A1 | 5/2006 | Osaka et al. |
| 2006/0291117 | A1 | 12/2006 | Kyono |

FOREIGN PATENT DOCUMENTS

JP 2005-51918 2/2005

OTHER PUBLICATIONS

U.S. Appl. No. 11/610,626, filed Dec. 14, 2006, Kyono.
U.S. Appl. No. 11/621,284, filed Jan. 9, 2007, Kyono.

* cited by examiner

Primary Examiner—Shawn Riley
(74) Attorney, Agent, or Firm—Oblon, Spivak, McClelland, Maier & Neustadt, P.C.

(57) ABSTRACT

A series circuit in which a first switching element and a second switching element are connected in series at both ends of an output of an input rectifier circuit for rectifying an alternating current of an alternating current power supply, a resonant circuit in which a primary winding of a transformer and a current resonant capacitor are connected in series at both ends of the first switching element or the second switching element, a rectifying and smoothing circuit for rectifying and smoothing a voltage generated across a secondary winding of the transformer during an on-period of the first switching element or the second switching element, a control circuit for alternately turning on/off the first switching element and the second switching based on a voltage from the rectifying and smoothing circuit, and a voltage detecting circuit for outputting a voltage detecting signal when a voltage at both ends of one switching element of the first switching element and the second switching element, which is turned on at a time of transmitting electric power to the rectifying and smoothing circuit, becomes equal to a predetermined voltage or more. The control circuit turns on the other switching element of the first switching element and the second switching element based on the voltage detecting signal from the voltage detecting circuit.

8 Claims, 16 Drawing Sheets

SWITCHING POWER SUPPLY DEVICE

BACKGROUND OF THE INVENTION

1. Field of the Invention

The present invention relates to a resonant-type switching power supply device. Specifically, the present invention relates to prevention of a through-current in a switching power supply device.

2. Description of the Related Art

FIG. 1 is a circuit configuration diagram of a conventional resonant-type switching power supply device. In FIG. 1, a full-wave rectifier circuit 2 (which corresponds to an input rectifier circuit) rectifies an alternating current of an alternating current power supply 1 for commercial use to output a full-wave rectifying voltage to a smoothing capacitor 3. The smoothing capacitor 3 obtains a direct current power supply Vin by smoothing the full-wave rectifying voltage of the full-wave rectifier circuit 2.

At both ends of the smoothing capacitor 3, a series circuit including a switching element Q1 consisting of a MOSFET or the like and a switching element Q2 consisting of a MOSFET or the like is connected.

The switching element Q2 is connected in parallel to a series resonant circuit consisting of a reactor Lr, a primary winding P1 (winding number N1) of a transformer T1 and a current resonant capacitor Cri, and a voltage resonant capacitor Crv. The reactor Lr may be a leakage inductance between the primary winding P1 and a secondary winding S of the transformer T1.

The primary winding P1 and a secondary winding S (winding number N2) of the transformer T1 are wound so as to generate a reverse phase voltage with respect to one another. A rectifying and smoothing circuit consisting of a rectifier D0 and a smoothing capacitor C0 is connected to the secondary winding S of the transformer T1. This rectifying and smoothing circuit rectifies and smoothes a voltage (pulse voltage which is controlled to be on/off) induced across the secondary winding S of the transformer T1 to output a direct current output Vo to a load not shown.

A feedback circuit 5 is connected to a connecting point of the smoothing capacitor C0 and the rectifier D0, and detects an output voltage of the smoothing capacitor C0 to output a detecting signal to a control circuit 7. The control circuit 7 controls the voltage of the load to be constant by alternately turning on/off the switching element Q1 and the switching element Q2 by pulse width modulation (PWM) control based on the detected voltage from the feedback circuit 5. In this case, voltage having a dead time is applied to each gate of the switching element Q1 and the switching element Q2 so as to alternately turn on/off the switching element Q1 and the switching element Q2.

Next, the operation of the conventional resonant-type switching power supply device configured as described above will be described by referring to a timing chart of FIG. 2. FIG. 2 is a timing chart of a signal in each part when the conventional switching power supply device is in a stationary state.

It should be noted that in FIGS. 2 to 4, $V_{Q1gs}$ is a gate signal between a gate and source of the switching element Q1, and $V_{Q2gs}$ is a gate signal between a gate and source of the switching element Q2. $V_{Q2ds}$ is a voltage between the drain and source of the switching element Q2. $I_{Q2}$ is a current flowing through the drain of the switching element Q2. $I_{Q1}$ is a current flowing through the drain of the switching element Q1. $I_{Lr}$ is a current flowing through the reactor Lr. $V_{cri}$ is a voltage at both ends of the current resonant capacitor Cri. $I_{D0}$ is a current flowing through the rectifier D0. In addition, with the dead time of around several 100 nS, the switching elements Q1 and Q2 are alternately turned on/off by the gate signals $V_{Q1gs}$ and $V_{Q2gs}$.

First, in an on-period of the switching element Q1 (for example, times t11 and t12), energy is stored in the current resonant capacitor Cri through an exciting inductance of the primary winding P1 of the transformer T1 and the reactor Lr (the leakage inductance between the primary winding P1 and secondary winding S of the transformer T1).

Next, in an on-period of the switching element Q2 (for example, times t12 to t14), the energy stored in the current resonant capacitor Cri is transmitted to the secondary side of the transformer T1, and the exciting energy of the exciting inductance of the primary winding P1 is reset.

In the on-period of the switching element Q2, a voltage of the current resonant capacitor Cri that has been divided by the exciting inductance of the primary winding P1 and the reactor Lr is applied to the primary winding P1. When Vf is a forward voltage drop of the rectifier D0 and the voltage of the primary winding P1 becomes (Vo+Vf)×N1/N2, the voltage is clamped. Then, a resonant current by the current resonant capacitor Cri and the reactor Lr is transmitted to the secondary side of the transformer T1 so that a current $I_{D0}$ flows through the rectifier D0. When the voltage of the primary winding P1 is less than (Vo+Vf)×N1/N2, the energy is not transmitted to the secondary side of the transformer T1 and the resonant operation is carried out only on the primary side of the transformer T1.

In this switching power supply device, the control circuit 7 controls an energy amount to be transmitted to the secondary side of the transformer T1 by changing the on-period of the switching element Q1 to change the voltage of the current resonant capacitor Cri. The on-period of the switching element Q2 is generally set by a time determined by the PWM control of the switching element Q1 or a resonant period for transmitting a current to the secondary side of the transformer T1 when frequencies are fixedly controlled.

In addition, just after the switching element Q1 is turned off (for example, just after time t12), an exciting current by the exciting inductance of the primary winding P1 and the reactor Lr flows through a body diode of the switching element Q2. Since the switching element Q2 is turned on during this period, zero voltage switching and zero current switching of the switching element Q2 can be carried out. Therefore, a switching loss is not caused.

When the switching element Q2 is off (for example, time t14), it is a period in which energy transmission to the secondary side of the transformer T1 is completed and only a cyclic current flows on the primary side of the transformer T1. Therefore, a peak of the current is low, and the switching loss is extremely small since a voltage quasi-resonant operation is carried out by the voltage resonant capacitor Crv. Just after the switching element Q2 is turned off, the cyclic current is regenerated to a direct current power supply Vin through the body diode of the switching element Q1. Since the switching element Q1 is turned on during this period, zero voltage switching and zero current switching of the switching element Q1 can be carried out. Therefore, a switching loss is not caused.

Meanwhile, in the switching power supply device, an output voltage is still low at the time of starting-up. In addition, when the output current becomes overloaded, the output voltage is generally lowered because electric power is limited due to over-current protection.

When the switching element Q2 is turned on, the cyclic current is generally set to be positive (the broken line portion of $I_{Lri}$ in FIG. 2, and times t12 and t13) when the period for transmitting energy to the secondary side of the transformer T1 is completed. However, when the output voltage decreases at the time of starting-up or overloading, the voltage, which is applied to the primary winding P1 during the on-period of the switching element Q2, is clamped at a voltage lower than a general voltage. Therefore, a time required for resetting the exciting energy becomes longer, and the cyclic current is kept negative when energy transmission to the secondary side of the transformer T1 is completed (the broken line portion of $I_{Lri}$ in FIG. 3, and times t22 and t23).

In addition, even in a power supply in which an overcurrent protection circuit is not provided and an output voltage does not decrease at the time of overloading, when frequencies are constant or the on-period of the switching element Q2 is determined by the energy transmission period to the secondary side of the transformer T1, the cyclic current is negatively superimposed in order to store larger energy to the current resonant capacitor Cri, and thus the cyclic current is kept negative when the energy transmission to the secondary side of the transformer T1 is completed.

In this state, the exciting energy of the primary winding P1 of the transformer T1 is not reset. In this time, the cyclic current flows in the reverse direction through the body diode of the switching element Q2, which is called resonance deviation. When the switching element Q1 is turned on in this state, the voltage Vin of the direct current power supply is applied to the body diode in the reverse direction and a reverse recovery current flows. In general, a body diode which is parasitically formed in a switching element takes a long time for reverse recovery, and thus large current flows therein. In the worst case, the circuit may be damaged.

In order to avoid this problem, it is only necessary to apply a voltage in the reverse direction when a current does not flow through the body diode. A method in which the switching element Q2 is turned off and the switching element Q1 is turned on while energy is transmitted to the secondary side of the transformer T1 (when the current of the switching element Q2 is positive), is possible. A timing chart of signals by this method is shown in FIG. 4.

However; when the switching element Q2 is turned off while the energy is transmitted to the secondary side of the transformer T1 (for example, time t33), just after that, the resonant operation of the reactor Lr and the voltage resonant capacitor Crv is caused with high frequencies by the exciting energy of the reactor Lr, and the current $I_{Lri}$ makes sharp decline to a level of the cyclic current (for example, times t33 and t34).

Since the cyclic current in this time is negative (for example, time t34), a current also flows through the body diode. Therefore, when the switching element Q1 is turned on, a large reverse current flows. It is only necessary for the switching element Q1 to be turned on when the current is positive during the switching element Q2 is turned off and the current is decreasing to the cyclic current. However, in order to prevent the both switching elements from being turned on, a dead time is provided since the switching element Q2 is turned off until the switching element Q1 is turned on. Therefore, it is difficult that the switching element Q1 is turned on after the switching element Q2 is turned off during this rapid current change.

In addition, when the switching element Q2 is turned off during the energy is transmitted to the secondary side of the transformer T1, a loss is caused by the recovery current of the rectifier D0. In addition, since a surge current is generated, a snubber circuit has to be added by using a high voltage rectifier.

Moreover, a method for solving these problems is disclosed in Japanese Patent Laid-open Application no. 2005-51918. The switching power supply device disclosed in the Japanese Patent Laid-open Application no. 2005-51918 is configured that a current of a body diode is detected by a current state detecting circuit so that the switching elements Q1 and Q2 are not turned on/off while the current flows through the body diode.

However, in the switching power supply device disclosed in the Japanese Patent Laid-open Application no. 2005-51918, a loss is caused in the current state detecting circuit and efficiency is deteriorated.

SUMMARY OF THE INVENTION

It is an object of the present invention to provide a switching power supply device in which a first switching element and a second switching element can be prevented from being in a state of a short-circuit even when they fall into a state of resonance deviation at the time of overloading or starting-up.

In a first aspect of the present invention, there are provided a series circuit in which a first switching element and a second switching element are connected in series at both ends of an output of an input rectifier circuit for rectifying alternating voltage of an alternating current power supply or at both ends of a direct current power supply, a resonant circuit in which a primary winding of a transformer and a current resonant capacitor are connected in series at the both ends of the first switching element or the second switching element, at least one pair of rectifying and smoothing circuits for rectifying and smoothing a voltage generated across a secondary winding of the transformer during an on-period of any one of the first switching element and the second switching element, a control circuit for alternately turning on/off the first switching element and the second switching element based on a voltage from the at least one pair of the rectifying and smoothing circuits, and a voltage detecting circuit for outputting a voltage detecting signal when the voltage at both ends of one switching element of the first switching element and the second switching element, which is turned on at a time of transmitting electric power to the at least one pair of the rectifying and smoothing circuits, becomes equal to a predetermined voltage or more. The control circuit turns on the other switching element of the first switching element and the second switching element based on the voltage detecting signal from the voltage detecting circuit.

According to the first aspect of the present invention, even when one switching element is turned off, the voltage generated at the both ends of the one switching element is the forward voltage drop of a diode when current flows through the body diode. The voltage becomes negative voltage in relation to the reference potential of the circuit. Therefore, the voltage detecting circuit determines that current does not flow through the body diode when the voltage detected at the both ends of the one switching element becomes equal to the predetermined voltage or more, and the control circuit turns on the other switching element. At this time, current does not flow through the body diode, and the reverse recovery current is extremely small.

That is, even in a state where the cyclic current becomes negative when the one switching element is off, an output voltage decreases to reset the exciting energy, and the other switching element is not turned on until the current of the one switching element is turned off. Therefore, a through-current caused by a reverse recovery time of the body diode of the one switching element can be prevented when the other switching element is turned on.

In a second aspect of the present invention, there are provided a series circuit in which a first switching element and a second switching element are connected in series at both ends of an output of an input rectifier circuit for rectifying alternating voltage of an alternating current power supply or at both ends of a direct current power supply, a resonant circuit in which a primary winding of a transformer and a current resonant capacitor are connected in series at both ends of the first switching element or the second switching element, at least one pair of rectifying and smoothing circuit for rectifying and smoothing a voltage generated across a secondary winding of the transformer during an on-period of any one of the first switching element and the second switching element, a control circuit for alternately turning on/off the first switching element and the second switching element based on a voltage from the at least one pair of the rectifying and smoothing circuits, and a voltage detecting circuit for outputting a voltage detecting signal when the voltage at both ends of one switching element of the first switching element and the second switching element, which are turned off at a time of transmitting electric power to the at least one pair of the rectifying and smoothing circuits, becomes equal to a predetermined voltage or less. The control circuit turns on the one switching element based on the voltage detecting signal from the voltage detecting circuit. According to the second aspect of the present invention, effects similar to the effects of the first aspect of the present invention can be obtained.

In a third aspect of the present invention, the voltage detecting circuit detects a change of the voltage at the both ends of the one switching element to output a voltage detecting signal.

In a fourth aspect of the present invention, the control circuit turns on the other switching element after a predetermined time has passed since the one switching element is turned off in the case where the voltage detecting signal from the voltage detecting circuit is absent when the one switching element, which is turned on at the time of transmitting electric power to the at least one pair of the rectifying and smoothing circuits, is turned off. Therefore, the other switching element may be turned on after a predetermined period to sufficiently reset the exciting energy of the transformer has passed.

In a fifth aspect of the present invention, the control circuit turns on the one switching element after a predetermined period has passed since the other switching element is turned off in the case where the voltage detecting signal from the voltage detecting circuit is absent when the other switching element of the first switching element and the second switching element, which is turned on at the time of transmitting electric power to the at least one pair of the rectifying and smoothing circuits, is turned off. Therefore, the one switching element may be turned on after a predetermined period to sufficiently reset the exciting energy of the transformer has passed.

In a sixth aspect of the present invention, in place of the voltage detecting circuit, an output voltage detecting circuit for detecting an output voltage is provided. The control circuit turns on the other switching element of the first switching element and the second switching element after a predetermined period has passed since the one switching element is turned off in the case where the output voltage from the output voltage detecting circuit is equal to a predetermined voltage or less when the one switching element of the first switching element and the second switching element, which is turned on at the time of transmitting electric power to the at least one pair of the rectifying and smoothing circuits, is turned off, and changes the predetermined period according to the output voltage. Therefore, the other switching element can be turned on after the exciting energy of the transformer is sufficiently reset. With this, the cyclic current caused by the reverse recovery time of the body diode of the one switching element can be prevented when the other switching element is turned on.

In a seventh aspect of the present invention, the output voltage detecting circuit has an auxiliary winding wound around the transformer, and outputs a voltage generated across the auxiliary winding to the control circuit as the output voltage. Therefore, the control circuit can change the predetermined period according to the output voltage.

DESCRIPTION OF THE PREFERRED EMBODIMENTS

Figure 1:
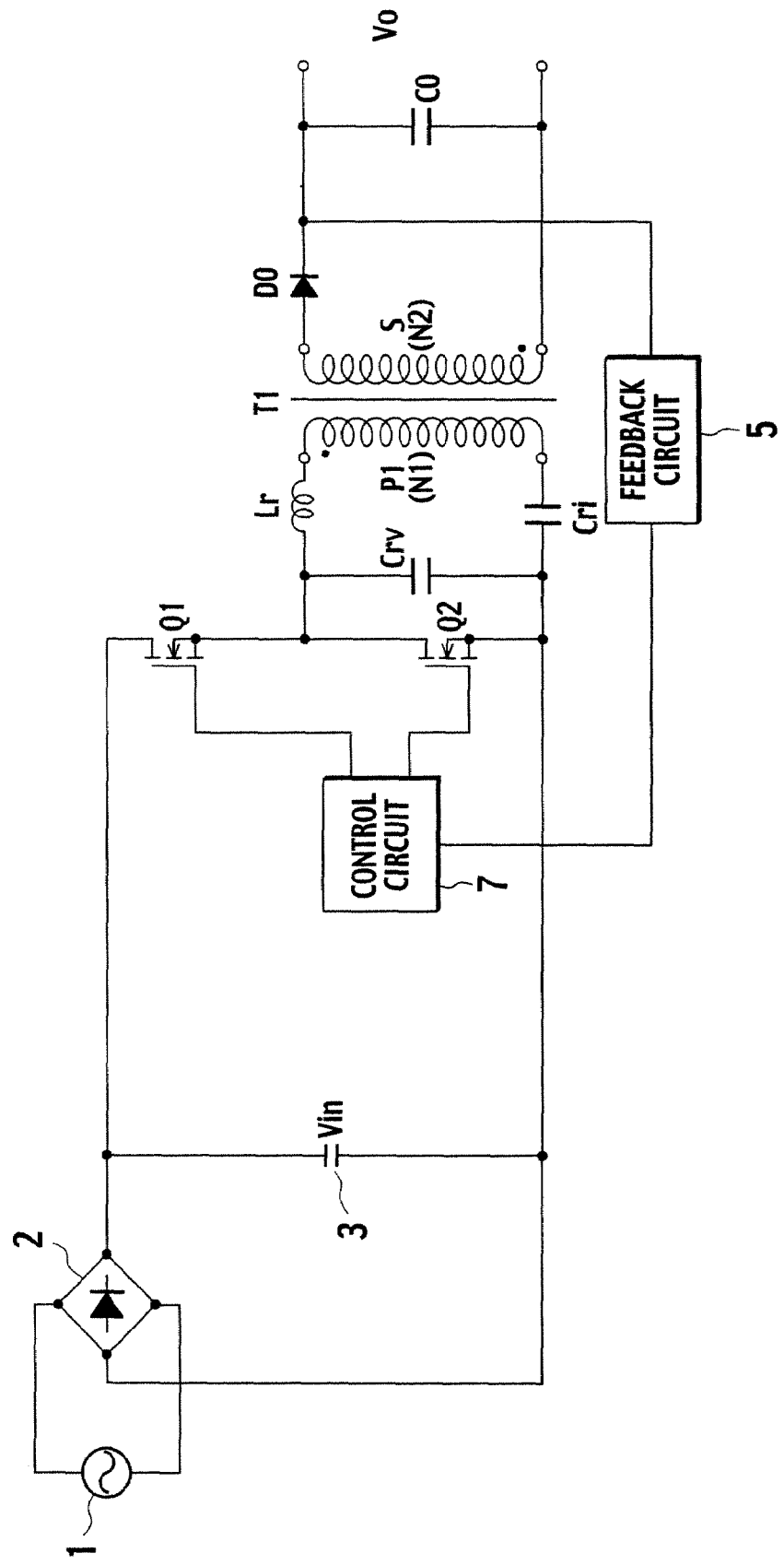
FIG. 1 is a circuit configuration diagram for showing a conventional switching power supply device.

Detailed description of preferred embodiments of a switching power supply device according to the present invention will be now given below by referring to the drawings.

First Embodiment

Figure 5:
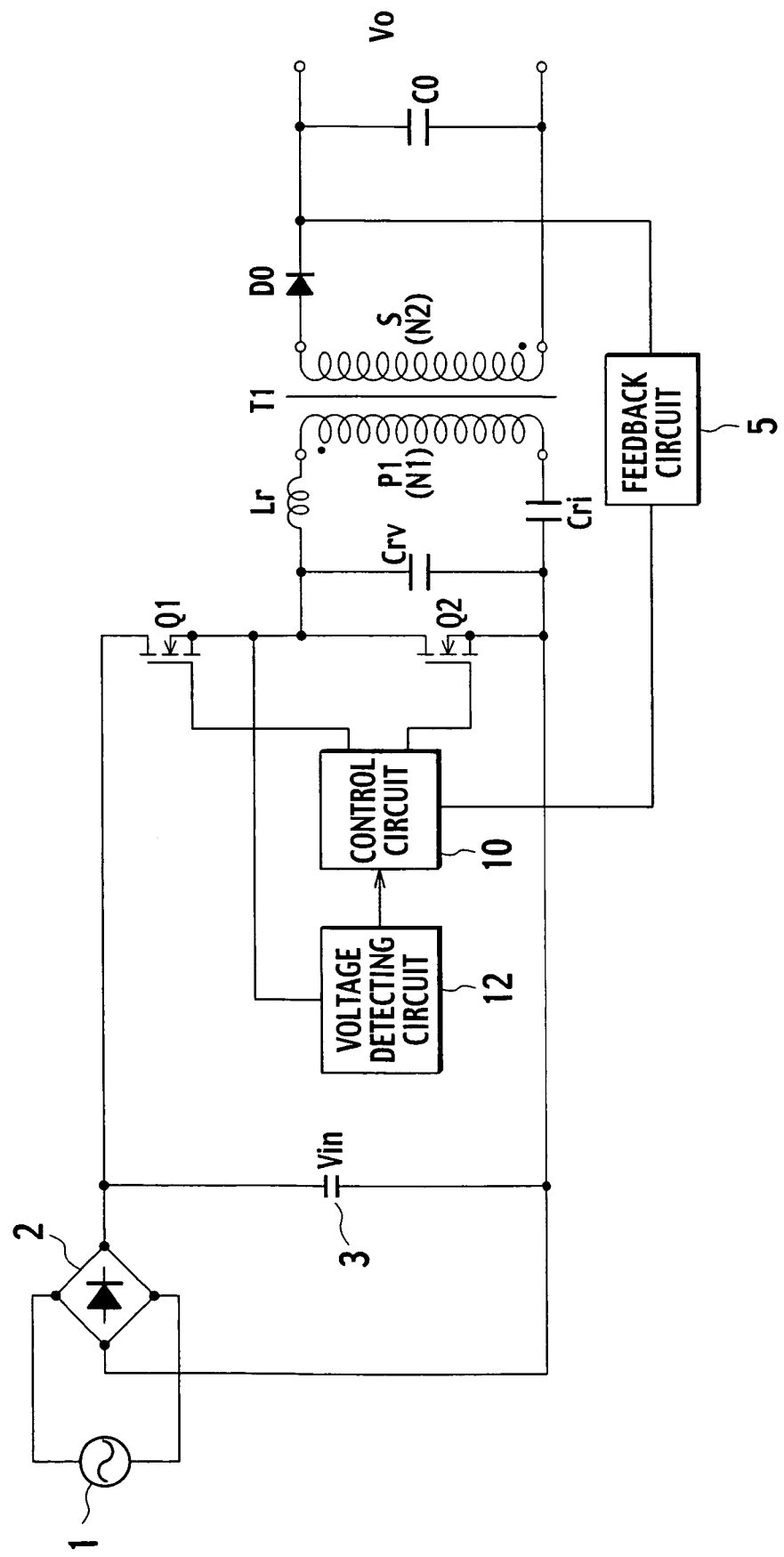
FIG. 5 is a circuit configuration diagram for showing a switching power supply device according to a first embodiment of the present invention.

FIG. 5 is a circuit configuration diagram for showing a switching power supply device according to a first embodiment of the present invention. In relation to the conventional switching power supply device shown in FIG. 1, the switching power supply device of the first embodiment shown in FIG. 5 is characterized by including a voltage detecting circuit 12 connected to a connecting point of a switching element Q1 and a switching element Q2, and a control circuit 10.

In FIG. 5, a full-wave rectifier circuit 2 (which corresponds to an input rectifier circuit) rectifies alternating voltage of an alternating current power supply 1 for commercial use to output full-wave rectifying voltage to a smoothing capacitor 3. The smoothing capacitor 3 obtains a direct current power supply Vin by smoothing the full-wave rectifying voltage of the full-wave rectifier circuit 2.

At both ends of this smoothing capacitor 3, a series circuit of the switching element Q1 consisting of MOSFET or the like and the second switching element Q2 consisting of MOSFET or the like is connected.

The switching element Q2 is connected in parallel with a series resonant circuit consisting of a reactor Lr, a primary winding P1 (winding number N1) of a transformer T1, and a current resonant capacitor Cri and a voltage resonant capacitor Crv.

The primary winding P1 and a secondary winding S (winding number N2) of the transformer T1 are wound so as to generate a reverse phase voltage with respect to one another. A rectifying and smoothing circuit consisting of a rectifier D0 and a smoothing capacitor C0 is connected to the secondary winding S of the transformer T1. This rectifying and smoothing circuit rectifies and smoothes a voltage (a pulse voltage controlled to be on/off) induced across the secondary winding of the transformer T1 to output a direct current output Vo to a load not shown.

A feedback circuit 5 is connected to a connecting point of the smoothing capacitor C0 and the rectifier D0, and detects an output voltage of the smoothing capacitor C0 to output a detecting signal to a control circuit 10. The control circuit 10 controls a voltage of the load so as to be constant by alternately turning on/off the switching element Q1 and the switching element Q2 by PWM control based on the detecting signal from the feedback circuit 5. In this case, a voltage having a dead time period is applied to each gate of the switching element Q1 and the switching element Q2 to alternately turn on/off the switching element Q1 and the switching element Q2.

The voltage detecting circuit 12 outputs the voltage detecting signal to the control circuit 10 when the voltage between the drain and source of the switching element Q2 becomes equal to a predetermined voltage or more after the switching element Q2 is turned off.

The control circuit 10 outputs an on-signal for turning on the switching element Q1 to the gate of the switching element Q1 when the voltage detecting signal is entered from the voltage detecting circuit 12.

According to the switching power supply device of the first embodiment configured as described above, in a stationary load state, the voltage resonant capacitor Crv is charged by a cyclic current just after the switching element Q2 is turned off so that the voltage between the drain and source of the switching element Q2 increases to be equal to a predetermined voltage or more. Therefore, the voltage detecting signal is output from the voltage detecting circuit 12 to the control circuit 10, and the control circuit 10 applies the on-signal to the gate of the switching element Q1 based on the voltage detecting signal from the voltage detecting circuit 12.

On the other hand, in a case where resonance deviation is caused in an overloaded state, the cyclic current keeps flowing through the body diode of the switching element Q2 even after the switching element Q2 is turned off. At this time, since the voltage between the drain and source of the switching element Q2 does not increase to the predetermined voltage, the off-period of both the switching element Q1 and the switching element Q2 are maintained.

At this time, when the exciting energy of an exciting inductance of the primary winding P1 is reset, the cyclic current is prone to flow in the reverse direction by the resonant operations of the exciting inductance of the primary winding P1, the reactor Lr, and the current resonant capacitor Cri.

The voltage resonant capacitor Crv is charged by this cyclic current to increase the voltage between the drain and source of the switching element Q2. When the voltage detecting circuit 12 detects that this increased voltage becomes equal to a predetermined voltage or more, the voltage detecting circuit 12 outputs the voltage detecting signal to the control circuit 10. The control circuit 10 applies the on-signal to the gate of the switching element Q1 based on the voltage detecting signal from the voltage detecting circuit 12. Therefore, short circuit current can be prevented without being affected by a reverse recovery time of the body diode.

In this manner, the voltage generated across the both ends of the switching element Q2 is a forward voltage drop of the diode when a current flows through the body diode even in the case where the switching element Q2 is turned off. Therefore, the voltage becomes negative voltage in relation to a reference potential of the circuit. Then, the voltage detecting circuit 12 detects the voltage at both ends of the switching element Q2 to determine that the current does not flow through the body diode when the detected voltage becomes equal to the predetermined voltage or more, and the control circuit 10 turns on the switching element Q2. In this time, since the current does not flow through the body diode, the reverse recovery current is extremely small.

That is, an output voltage decreases to reset the exciting energy even in a state where the cyclic current becomes negative while the switching element Q2 is off, and the switching element Q1 is not turned on until the current of the body diode of the switching element Q1 is turned off. Accordingly, the cyclic current by the reverse recovery time of the body diode of the switching element Q2 can be prevented when the switching element Q2 is turned on.

Next, specific examples of the operation of the voltage detecting circuit and the control circuit will be described.

Figure 6:
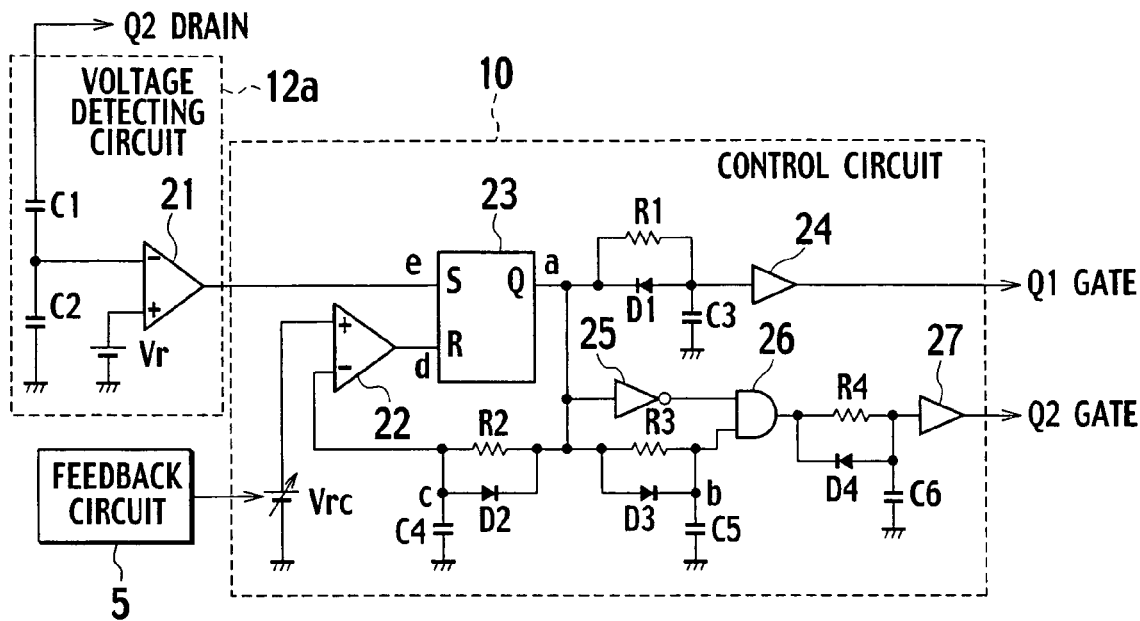
FIG. 6 is a circuit configuration diagram for showing details of a voltage detecting circuit and a control circuit of the switching power supply device according to the first embodiment of the present invention.

FIG. 6 is a circuit configuration diagram for showing details of the voltage detecting circuit and the control circuit of the switching power supply device according to the first embodiment of the present invention.

In FIG. 6, a voltage detecting circuit 12a includes a capacitor C1 whose one end is connected to the drain of the switching element Q2, a capacitor C2 whose one end is connected to the one end of the capacitor C1 and the other end is grounded, and a comparator 21 for comparing the reference voltage entered into a positive terminal with the partial voltage of the capacitor C1 and capacitor C2, which is entered into a negative terminal. The feedback circuit 5 obtains an error voltage between the output voltage of the smoothing capacitor C0 and the reference voltage not shown, and outputs this error voltage as an error signal.

Next, the configuration of the control circuit 10 will be described in detail. A comparator 22 compares a reference voltage Vrc which is entered into a positive terminal with a voltage of a capacitor C4 which is entered into a negative terminal. The reference voltage Vrc is a voltage that is generated in proportion to the error signal from the feedback circuit 5. A flip-flop 23 enters a compared output of the comparator 21 to a set terminal S, a compared output of the comparator 22 to a reset terminal R, and an output is output from an output terminal Q.

One end of a resistance R1 and a cathode of a diode D1 are connected to the output terminal Q of the flip-flop 23, and the other end of the resistance R1, an anode of the diode D1, one end of the capacitor C3, and an input end of a buffer 24 are commonly connected. The other end of the capacitor C3 is grounded, and an output end of the buffer 24 is connected to the gate of the switching element Q1 through a level shifting circuit not shown (such as a high side driver and a drive transformer).

In addition, one end of a resistance R2 and a cathode of a diode D2 are connected to the output terminal Q of the flip-flop 23. The other end of the resistance R2, an anode of a diode D2, and one end of the capacitor C4 are connected to a negative terminal of the comparator 22, and the other end of the capacitor C4 is grounded.

Further, an input end of an inverter 25, one end of a resistance R3, and an anode of a diode D3 are connected to the output terminal Q of the flip-flop 23. An output end of the inverter 25 is connected to one input end of an AND circuit 26. The other end of the resistance R3, a cathode of the diode D3, and one end of a capacitor C5 are connected to the other end of the input end of an AND circuit 26, and the other end of capacitor C5 is grounded. One end of the resistance R4 and the cathode of the diode D4 are connected to the output terminal of the AND circuit 26. The other end of the resistance R4, the anode of the diode D4, and one end of a capacitor C6 are connected to the input end of the buffer 27, and the output end of the buffer 27 is connected to the gate of the switching element Q2. The other end of the capacitor C6 is grounded.

Figure 8:
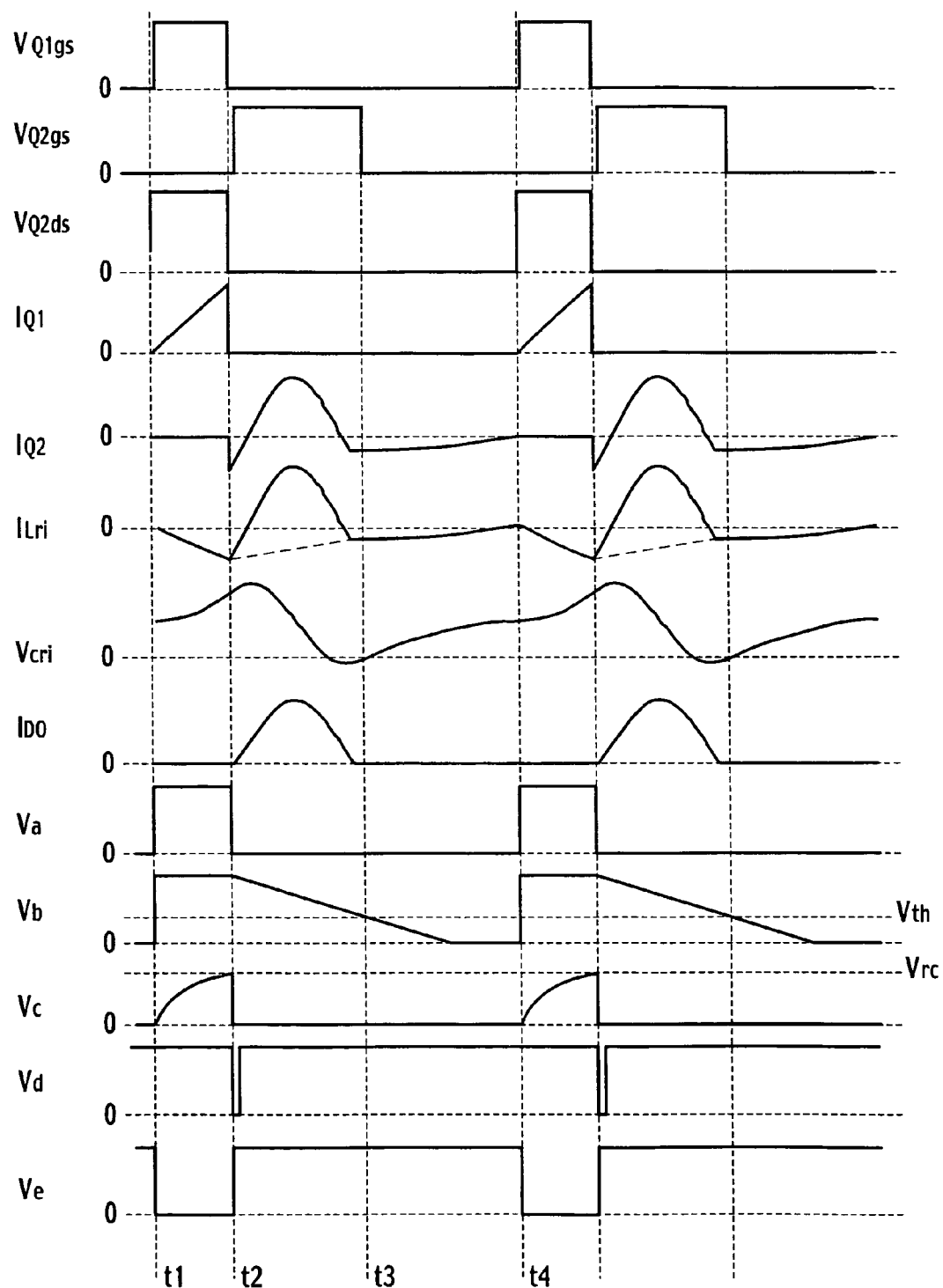
FIG. 8 is a timing chart of signals at each part of the switching power supply device according to the first embodiment of the present invention.

Next, the operations of the voltage detecting circuit 12a and the control circuit 10 shown in FIG. 6, which are configured as described above, will be described by referring to a timing chart shown in FIG. 8. It should be noted that outputs Va to Ve shown in FIG. 8 show voltages at points a to e shown in FIG. 6.

First, at time t1, when a voltage $V_{Q2ds}$ of the switching element Q2 starts up and the voltage divided by the capacitor C1 and the capacitor C2 becomes equal to a reference voltage Vr or more, an output of the comparator 21, that is an output Ve at point e and an input level of the set terminal S of the flip-flop 23, becomes L level.

An output of the flip-flop 23, that is an output Va at point a, becomes H level. Then, the output Va is delayed by a time constant of the resistance R1 and the capacitor C3, and the delayed output Va is output to the gate of the switching element Q1 as a gate signal $V_{Q1gs}$ of the switching element Q1 through the buffer 24 for waveform shaping. At this time, the capacitor C4 is charged by the output Va through the resistance R2, and the voltage of the capacitor C4, that is a voltage Vc at point c, is increased by the time constant of the resistance R2 and the capacitor C3 at time t1 to time t2.

In addition, the H level of the output Va is reversed by the inverter 25 to be L level, and the capacitor C5 becomes H level by being rapidly charged by H level of the output Va through the diode D3. Therefore, the output of the AND circuit 26 is in an L level state and the output of the buffer 27 is also in an L level state, and thus a gate signal $V_{Q2gs}$ is not output to the switching element Q2.

Next, at time t2, the output of the comparator 22, that is an output Vd at point d, becomes L level when a voltage at point c reaches at a Vrc. Therefore, the output of the flip-flop 23 is reset to be reversed to the L level. Then, the voltage of the capacitor C3 is rapidly discharged through the diode D1, and the output of the buffer 24 becomes L level. Therefore, the gate signal $V_{Q1gs}$ to the switching element Q1 is not output, and the switching element Q1 is turned off.

That is, a period between time t1 and time t2 changes according to the amplitude of the voltage Vrc. In addition, the period between time t1 and time t2, that is the period while the switching element Q1 is turned on, is adjusted by the signal from the feedback circuit 5 so that the output voltage VO can be controlled.

The current flowing through the route of Vin, Q1, Lr, P1, Cri, and Vin in this order when the switching element Q1 is turned on, starts to flow through the route of Lr, P1, Cri, a parasitic diode of Q2, and Lr in this order when the switching element Q1 is turned off. Therefore, the voltage applied to the switching element Q2 becomes unavailable. Therefore, the voltage divided by the capacitor C1 and the capacitor C2 becomes also unavailable, and the output of the comparator 21 becomes H level.

In addition, the voltage Vc of the capacitor C4 is rapidly discharged through the diode D2 to become L level. Therefore, the output of the comparator 22 is reversed from L level to H level.

When the output Va at point a of the flip-flop 23 becomes L level, the output of the inverter 25 becomes H level. Since the input of the AND circuit 26 also becomes H level by the voltage Vb of the charged capacitor C5, the output of the AND circuit 26 becomes H level. With this H level, the capacitor C6 is charged through the resistance R4. The voltage of the capacitor C6 is slightly delayed so as to prevent an error operation, and the delayed voltage is output as the gate signal $V_{Q2gs}$ to the switching element Q2 through the buffer 27. In addition, the voltage Vb of the capacitor C5 starts gradual discharge through the resistance R3.

Next, when the voltage Vb becomes a threshold Vth (a threshold of the AND circuit 26) by gradually decreasing the voltage Vb of the capacitor C5 (time t3), the input of the AND circuit 26 becomes L level. Therefore, the output of the AND circuit 26 is reversed to L level. Then, the voltage of the capacitor C6 is discharged through the diode D4, and the output of the buffer 27 becomes L level, and thus the gate signal $V_{Q2gs}$ to the switching element Q2 is stopped to be output.

In the example shown in FIG. 8, the current $I_{Lri}$ flowing through the reactor Lr is a negative current even when the switching element Q2 is turned off at time t3. Therefore, the voltage of the switching element Q2 is not started up and this state is maintained.

Next, the current $I_{Lri}$ flowing through the reactor Lr becomes a positive current at time t4, and the voltage $V_{Q2ds}$ of the switching element Q2 starts up. Then, when the voltage divided by the capacitor C1 and the capacitor C2 becomes equal to a reference voltage Vr or more as a predetermined voltage, the output of the comparator 21, that is the output Ve at point e and the input level of the set terminal S of the flip-flop 23, becomes L level. Therefore, the operation at time t4 returns to a similar operation of the operation at time t1. The above described operations will be repeated.

Figure 2:
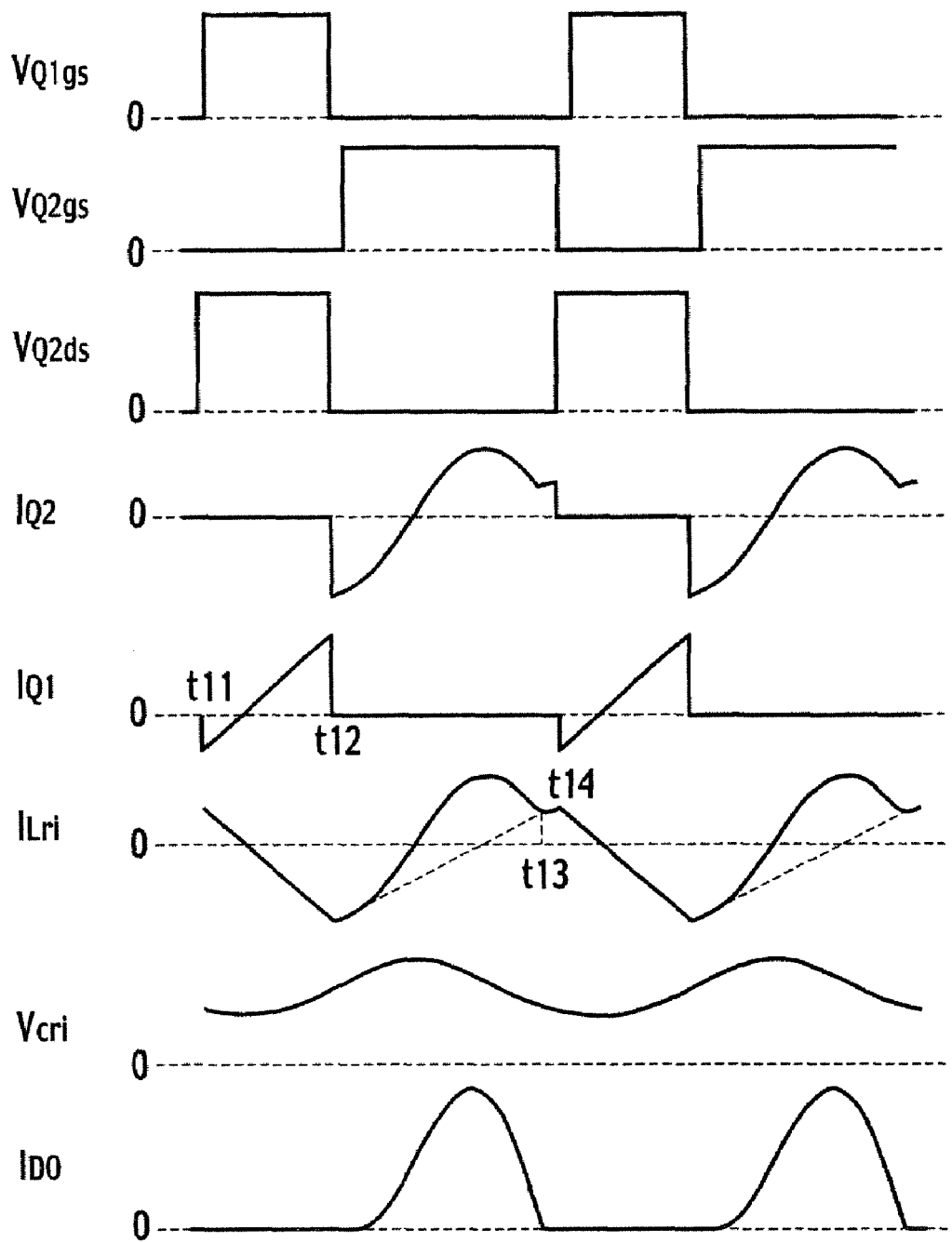
FIG. 2 is a timing chart of signals at each part when the conventional switching power supply device is in a stationary state.
Figure 3:
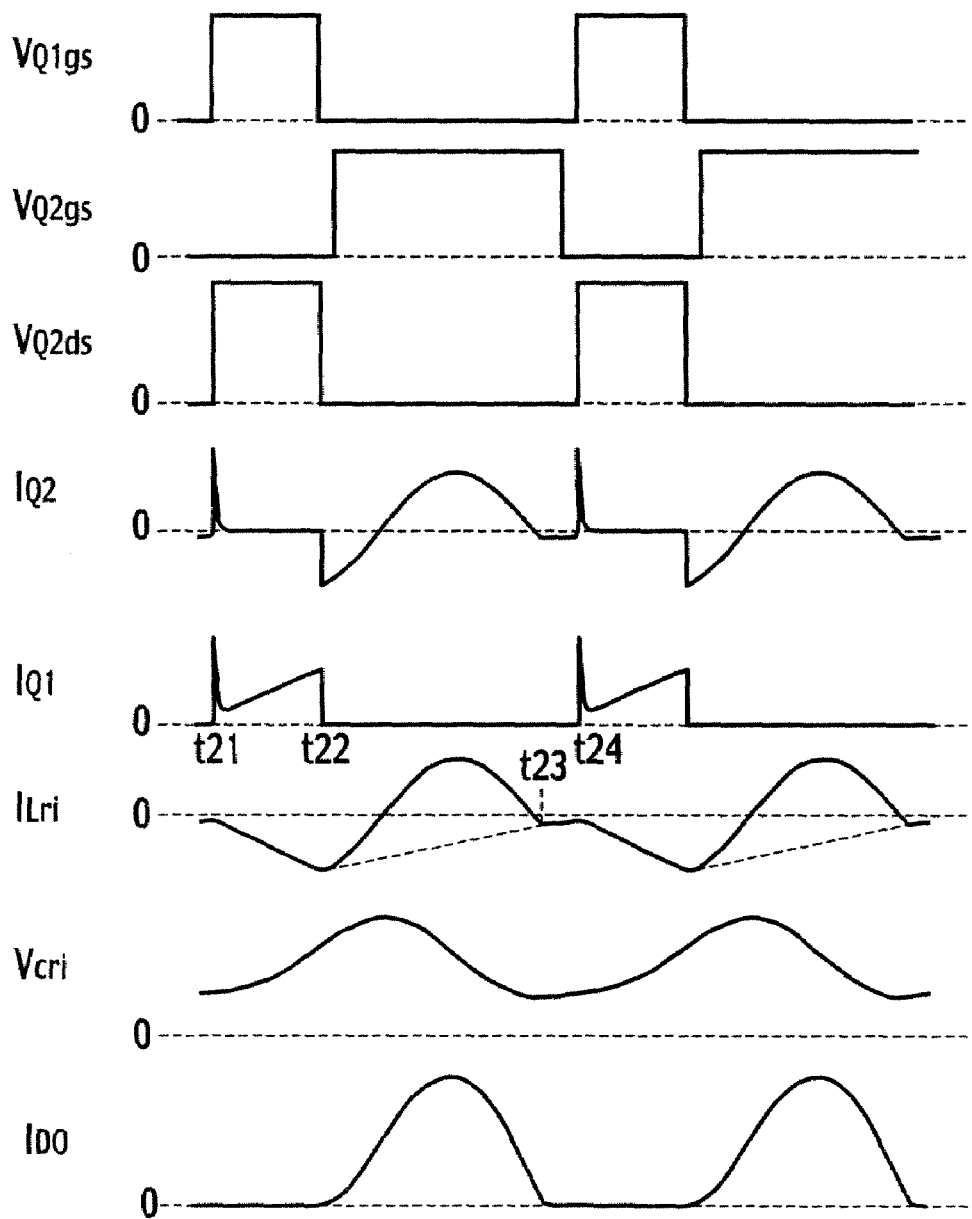
FIG. 3 is a timing chart of signals at each part when the conventional switching power supply device is overloaded.
Figure 4:
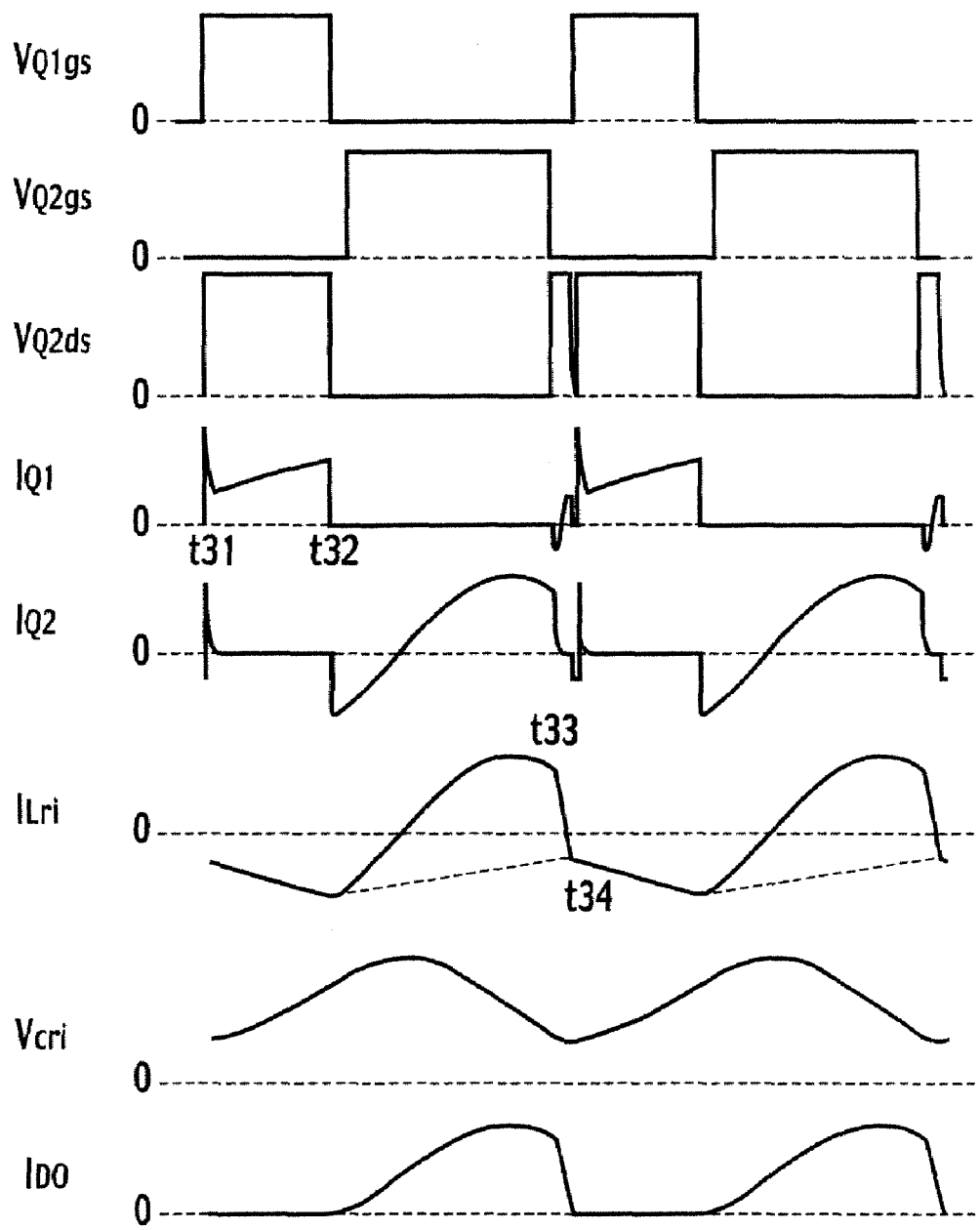
FIG. 4 is a timing chart of signals at each part when the conventional switching power supply device is overloaded.

In addition, in the stationary load state as shown in the example of FIG. 2, when the switching element Q2 is turned off at time t14, the current $I_{Lri}$ flowing through the reactor Lri is a positive current. Therefore, the voltage $V_{Q2ds}$ of the switching element Q2 starts up and the switching element Q1 is immediately turned on.

Figure 7:
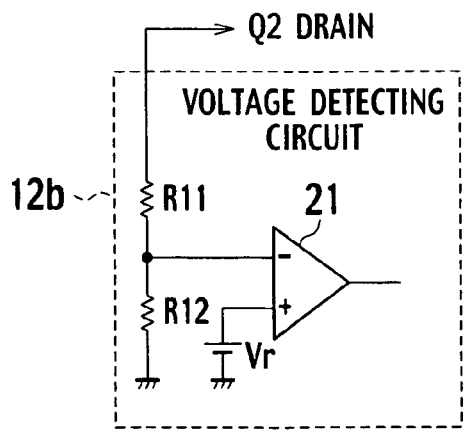
FIG. 7 is a diagram for showing another configuration example of the voltage detecting circuit.

It should be noted that the voltage detecting circuit 12b may detect, for example as shown in FIG. 7, that the switching element Q2 becomes equal to a predetermined voltage or more by entering the partial voltage of a resistance R11 and a resistance R12 into a negative terminal of the comparator 21 and a reference voltage Vr into a positive terminal of the comparator 21.

Second Embodiment

A switching power supply device according to a second embodiment monitors a voltage at both ends of a switching element Q2 just after the switching element Q2 is turned off, and prevents a switching element Q1 from being turned on for a predetermined period in order to sufficiently reset a exciting current of an exciting inductance of a primary winding P1 when the voltage does not increase just after the switching element Q2 is turned off, that is in the case where a cyclic current flows through a body diode when the switching element Q2 is off.

Figure 9:
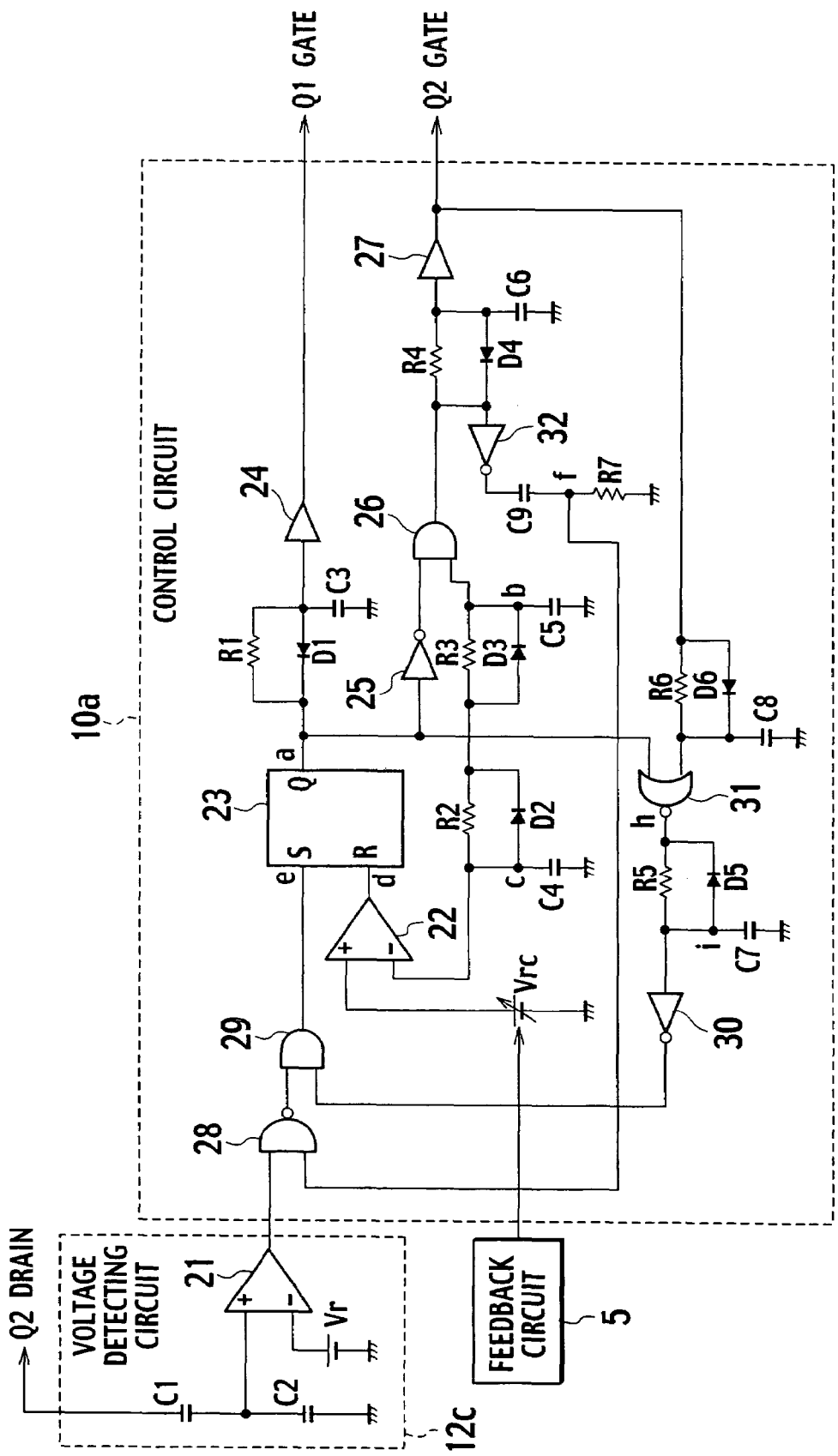
FIG. 9 is a circuit configuration diagram for showing details of a voltage detecting circuit and a control circuit of a switching power supply device according to a second embodiment of the present invention.

The second embodiment has a substantially similar circuit configuration with the circuit configuration of the first embodiment shown in FIG. 5, and is different in configurations of a voltage detecting circuit 12c and a control circuit 10a shown in FIG. 9. Here, only different parts in the configuration shown in FIG. 9 in relation to the configuration shown in FIG. 6 will be described.

In the voltage detecting circuit 12c shown in FIG. 9, a reference voltage Vr is entered into a negative terminal of a comparator 21, and a partial voltage of a capacitor C1 and a capacitor C2 is entered into a positive terminal of the comparator 21.

The control circuit 10a turns on the switching element Q1 after a predetermined time has passed since the switching element Q2 is turned off in the case where the voltage at both ends of the switching element Q2 does not reach at a predetermined voltage when the switching element Q2 is turned off.

The control circuit 10a is configured by further adding to the configuration of the control circuit 10 shown in FIG. 6 a NAND circuit 28, an AND circuit 29, an inverter 30, a NOR circuit 31, an inverter 32, resistances R5 to R7, capacitors C7 to C9, and diodes D5 and D6.

The NAND circuit 28 takes NAND with an output from the comparator 21 and a voltage of the resistance R7 (a voltage Vf at point f). The AND circuit 29 takes AND with an output of the inverter 30 and an output of the NAND circuit 28, and outputs the output thereof to a set terminal S of a flip-flop 23.

An input end of the inverter 32 is connected to an output end of the AND circuit 26, one end of the resistor R4, and an anode of the diode D4. An output end of the inverter 32 is grounded through a series circuit of the capacitor C9 and the resistance R7. A connecting point of the resistance R7 and the capacitor C9 is connected to an input end of the NAND circuit 28.

One end of the resistance R6 and an anode of the diode D6 are connected to an output end of the buffer 27. The other end of the resistance R6 and a cathode of the diode D6 are connected to one end of the capacitor C8 and one input end of the NOR circuit 31, and the other end of the capacitor C8 is grounded. The other input end of the NOR circuit 31 is connected to an output terminal Q of the flip-flop 23, and the output of the NOR circuit 31 is connected to one end of the resistance R5 and a cathode of the diode D5. The other end of the resistance R5 and an anode of the diode D5 are connected to one end of the capacitor C7 and an input end of the inverter 30, and an output end of the inverter 30 is connected to one input end of the AND circuit 29. The other end of the capacitor C7 is grounded.

In the second embodiment, in relation to the first embodiment, a timing to set the flip-flop 23 is different. The voltage detecting circuit 12c, the NAND circuit 28, the AND circuit 29, the inverter 32, and a peripheral circuit thereof detect whether or not a voltage $V_{Q2ds}$ of the switching element Q2 starts up when a gate signal $V_{Q2gs}$ of the switching element Q2 becomes L level, and set the flip-flop 23 when the voltage $V_{Q2ds}$ has started up.

The inverter 30, the NOR circuit 31 and the peripheral circuit thereof set the flip-flop 23 after delaying by a time generated by a time constant of the resistance R5 and the capacitor C7 in the case where the voltage $V_{Q2ds}$ of the switching element Q2 does not start up when the gate signal $V_{Q2gs}$ of the switching element Q2 becomes L level and the set signal is not output in the voltage detecting circuit 12c, the AND circuit 28, the inverter 32, and the peripheral circuit thereof.

Figure 10:
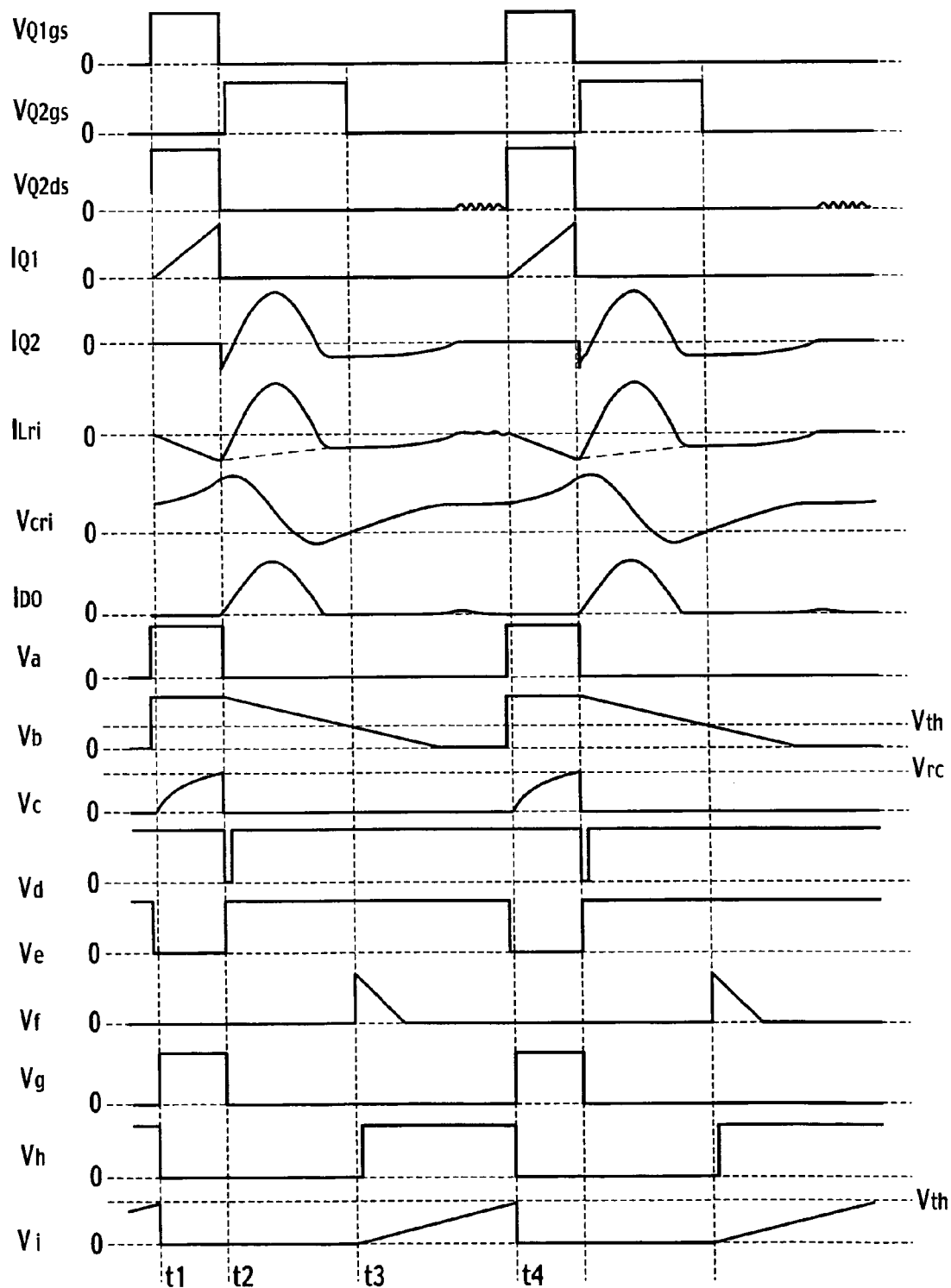
FIG. 10 is a timing chart of signals at each part of the switching power supply device according to the second embodiment of the present invention.

The operations of the voltage detecting circuit 12c and the control circuit 10a, which are configured as described above and shown in FIG. 9, will now be described by referring to a timing chart of signals shown in FIG. 10. It should be noted that outputs Va to Vi in FIG. 10 show voltages at points a to i in FIG. 9. Here, the operations of the inverter 32 and the peripheral circuit thereof, and the operations of the inverter 30, the NOR circuit 31, and the peripheral circuit thereof will be mainly described.

First, the operations of the inverter 32 and the peripheral circuit thereof will be described. When the gate signal $V_{Q2gs}$ of the switching element Q2 becomes L level, and the voltage $V_{Q2ds}$ of the switching element Q2 immediately starts up, that is, in the case of a normal operation, the output of the comparator 21 and one input of the NAND circuit 28 become H level.

In addition, when the gate signal $V_{Q2gs}$ of the switching element Q2 becomes L level, that is, when the output of the AND circuit 26 becomes L level, the output of the inverter 32 becomes H level. Since the voltage Vf at point f is determined by the time constant of the resistance R7 and the capacitor C9, the one input of the NAND circuit 28 becomes H level for a time determined by the time constant. Therefore, the output of the NAND circuit 28 becomes L level for the time determined by the time constant of the resistance R7 and the capacitor C9 to set the flip-flop 23 only when the voltage $V_{Q2ds}$ of the switching element Q2 starts up immediately after the gate signal $V_{Q2gs}$ of the switching element Q2 becomes L level.

On the other hand, when the gate signal $V_{Q2gs}$ of the switching element Q2 becomes L level at time t3 and the voltage $V_{Q2ds}$ of the switching element Q2 does not immediately start up (when the time until the voltage $V_{Q2ds}$ starts up is longer than a time determined by the time constant of the resistance R7 and the capacitor C9 and a threshold of the NAND circuit 28), an L level signal is entered into the NAND circuit 28 from the comparator 21. Therefore, the output of the NAND circuit 28 maintains H level.

Next, the operations of the inverter 30, the NOR circuit 31, and the peripheral circuit thereof will be described. The NOR circuit 31 takes NOR with the output of the flip-flop 23 and the gate signal $V_{Q2gs}$ of the switching element Q2. When the flip-flop 23 is set immediately after the gate signal $V_{Q2gs}$ of the switching element Q2 becomes L level, that is, in the case of a normal operation, the L level signal of the gate signal $V_{Q2gs}$ of the switching element Q2 is entered into the NOR circuit 31 while being delayed by the resistance R6 and the capacitor C8. Therefore, there is no timing for all the inputs of the NOR circuit 31 to become L level, and the output of the NOR circuit 31 maintains L level and the output of the inverter 30 maintains H level.

On the other hand, at time t3, the gate signal $V_{Q2gs}$ of the switching element Q2 becomes L level. When the voltage $V_{Q2ds}$ of the switching element Q2 does not immediately start up, the output Va of the flip-flop 23 maintains L level at time t3 and time t4 even when the gate signal $V_{Q2gs}$ of the switching element Q2 becomes L level. The output Vh of the NOR circuit 31 becomes H level. With this H level, the capacitor C7 is charged through the resistance R5.

Next, when the voltage Vi of the capacitor C7 reaches at the threshold Vth of the inverter 30 at time t4, the output of the inverter 30 is reversed to L level. This L level is entered into the AND circuit 29, and the output Va of the flip-flop 23 becomes H level. Therefore, the gate signal $V_{Q1gs}$ of the switching element Q1 is output.

In addition, since the output of the NOR circuit 31 becomes L level, and the capacitor C7 is rapidly discharged through the diode D5, the input of the inverter 30 becomes L level, and the output of the inverter 30 is returned to H level.

In this manner, in the second embodiment, the voltage at the both ends of the switching element Q2 just after the switching element Q2 is turned off is monitored. Then, when the voltage does not increase just after the switching element Q2 is turned off, that is when a cyclic current flows through the body diode when the switching element Q2 is turned off, the switching element Q1 is prevented from being turned on for a predetermined period to sufficiently reset the exciting energy of the exciting inductance of the primary winding P1. Accordingly, a through-current caused by the reverse recovery time of the body diode of the switching element Q2 can be prevented when the switching element Q1 is turned on.

Third Embodiment

Figure 11:
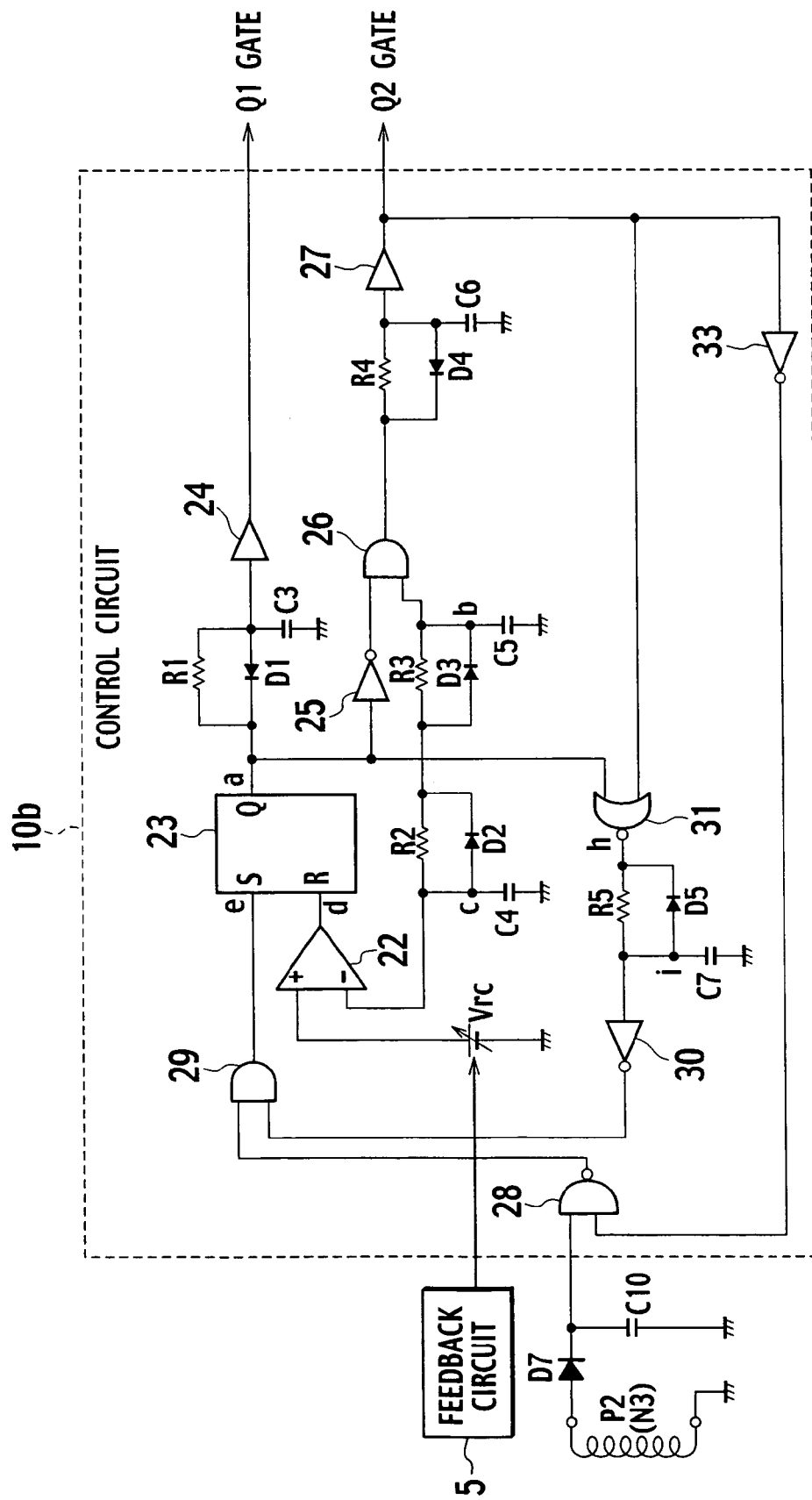
FIG. 11 is a circuit configuration diagram for showing details of a voltage detecting circuit and a control circuit of a switching power supply device according to a third embodiment of the present invention.

FIG. 11 is a circuit configuration diagram for showing details of a voltage detecting circuit and a control circuit of a switching power supply according to a third embodiment.

In relation to the circuit configuration of the second embodiment shown in FIG. 9, the third embodiment is different in that the voltage detecting circuit 12c is removed, an auxiliary winding P2 is provided, and a configuration of a control circuit 10b shown in FIG. 11 is different. Here, only different parts in the configuration shown in FIG. 11 in relation to the configuration shown in FIG. 9 will be described.

The control circuit 10b turns on a switching element Q1 after a predetermined period has passed since a switching element Q2 is turned off in the case where a voltage at both ends of the switching element Q2 does not reach at a predetermined voltage when the switching element Q2 is turned off, and changes the predetermined time according to an output voltage from the auxiliary winding P2.

The auxiliary winding P2 (winding number N3) is closely coupled to a secondary winding S of a transformer T1, and takes a voltage generated across the secondary winding S, that is a voltage according to an output voltage Vo, and outputs the voltage rectified and smoothed by a diode D7 and a capacitor C10 to one input end of a NAND circuit 28. The auxiliary winding P2, the diode D7, and the capacitor C10 correspond to an output voltage detecting circuit of the present invention.

In relation to the configuration of the control circuit 10a shown in FIG. 9, in the control circuit 10b, the inverter 32, the capacitor C9, and the resistance R7 are removed. The control circuit 10b is characterized in that an inverter 33 connected to the output of the buffer 27 and the input of the NAND circuit 28 is provided and an output voltage detecting circuit consisting of the auxiliary winding P2, the diode D7, and the capacitor C10 is provided.

That is, in the second embodiment, the peripheral circuit of the inverter 32 determines whether or not the flip-flop 23 is set. When the flip-flop 23 is not set (that is, the voltage $V_{Q2ds}$ of the switching element Q2 does not start up even when the gate signal $V_{Q2gs}$ of the switching element Q2 becomes L level), the flip-flop 23 is set after the time is delayed by the time constant of the resistance R5 and the capacitor C7.

In contrast, in the third embodiment, the peripheral circuit of the inverter 32 is removed, and the flip-flop 23 is alternatively set by the voltage from the auxiliary winding P2 of the transformer T1 and the voltage from the inverter 33.

In a normal operation, a phenomenon that the voltage $V_{Q2ds}$ of the switching element Q2 does not start up even when the gate signal $V_{Q2gs}$ of the switching element Q2 becomes L level does not occur. This phenomenon occurs when the output voltage becomes lower than a predetermined voltage at the time of starting-up and at the time when the over-current protection circuit operates.

Therefore, in the third embodiment, the voltage generated across the auxiliary winding P2 is rectified and smoothed by the diode D7 and the capacitor C10 to be entered into the NAND circuit 28. When this voltage is higher than a predetermined voltage, it is determined that the voltage $V_{Q2ds}$ of the switching element Q2 starts up when the gate signal $V_{Q2gs}$ of the switching element Q2 becomes L level. That is, the voltage $V_{Q2ds}$ of the switching element Q2 is detected and the flip-flop 23 is set. In this case, since the output of the NAND circuit 28 becomes L level, and the output of the AND circuit 29 becomes L level, the flip-flop 23 is set.

On the other hand, the voltage generated across the auxiliary winding P2 is rectified and smoothed by the diode D7 and the capacitor C10 to be entered into the NAND circuit 28. When this voltage is lower than a predetermined voltage, it is determined that the voltage $V_{Q2ds}$ of the switching element Q2 does not start up even when the gate signal $V_{Q2gs}$ of the switching element Q2 becomes L level. In this case, the flip-flop 23 is set by the inverter 30 of the control circuit 10a and the peripheral circuit of the NOR circuit 31 after a predetermined time has passed.

In this manner, the switching element Q1 is turned on after the exciting energy of the transformer T1 is sufficiently reset by detecting the output voltage of the auxiliary winding P2 to change the predetermined period according to the output voltage. Accordingly, a through-current caused by the reverse recovery time of the body diode of the second switching element can be prevented when the switching element Q1 is turned on.

Fourth Embodiment

Figure 12:
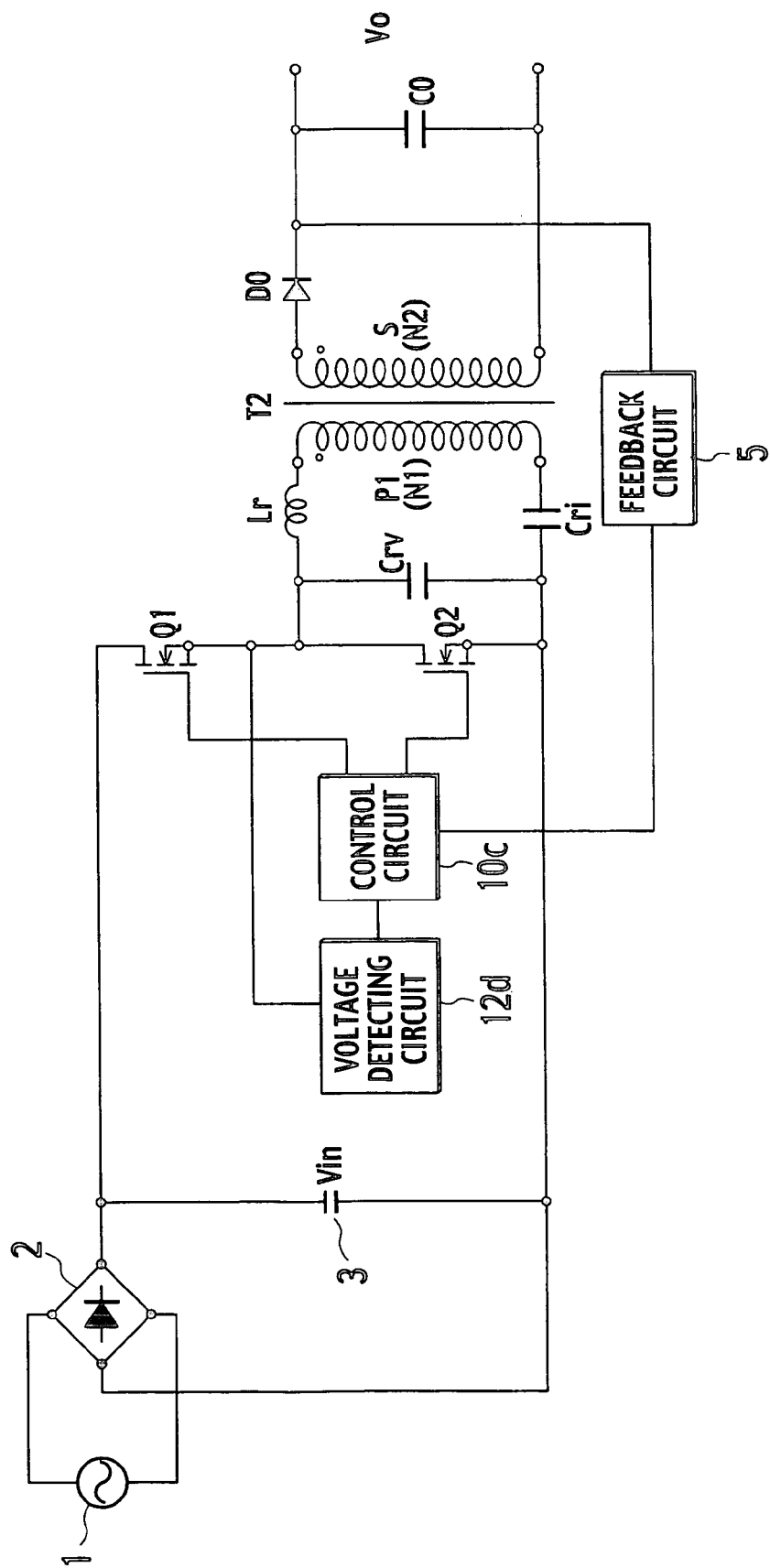
FIG. 12 is a circuit configuration diagram for showing a switching power supply device according to a fourth embodiment of the present invention.

FIG. 12 is a circuit configuration diagram for showing a switching power supply device according to a fourth embodiment of the present invention. Different from the switching power supply device of the first embodiment shown in FIG. 5, the switching power supply device of the fourth embodiment shown in FIG. 12 in which a primary winding P1 of a transformer T2 and a secondary winding S are set to be homopolar, transmits energy on a primary side of a transformer T1 to a rectifying and smoothing circuit on a secondary side when a switching element Q1 is turned on.

In addition, a voltage detecting circuit 12d outputs a voltage detecting signal when a voltage at both ends of a switching element Q2, which is turned off at the time of transmitting the energy to the secondary side of the transformer T2, becomes equal to a predetermined voltage or less. The control circuit 10c turns on the switching element Q2 by the voltage detecting signal from the voltage detecting circuit 12d.

Figure 13:
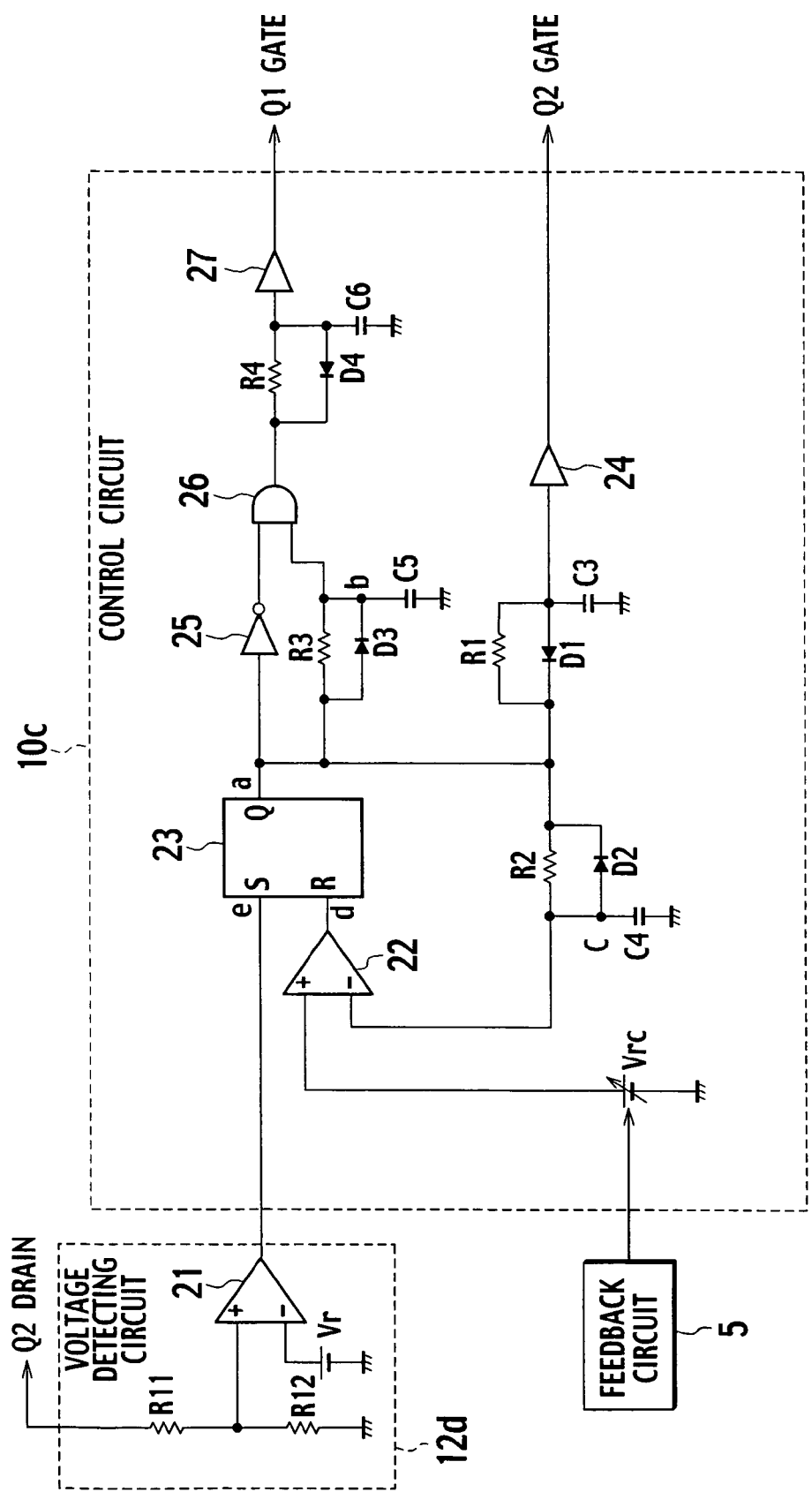
FIG. 13 is a circuit configuration diagram for showing details of a voltage detecting circuit and a control circuit of the switching power supply device according to the fourth embodiment of the present invention.

FIG. 13 is a circuit configuration diagram for showing details of the voltage detecting circuit and the control circuit of the switching power supply device according to the fourth embodiment of the present invention.

In FIG. 13, the voltage detecting circuit 12d has a resistance R11 whose one end is connected to a drain of the switching element Q2, a resistance R12 whose one end is connected to the one end of the resistor R11 and the other end is grounded, and a comparator 21 for comparing a reference voltage Vr entered into a negative terminal with a partial voltage of the resistance R11 and R12 entered into a positive terminal.

The resistance R1, the diode D1, the capacitor C3, and the buffer 24 are provided between the output terminal Q of the flip-flop 23 and the gate of the switching element Q1 in the control circuit 10 shown in FIG. 6. On the contrary, in the control circuit 10c shown in FIG. 13, these are provided between the output terminal Q of the flip-flop 23 and the gate of the switching element Q2.

In addition, the inverter 25, the resistance R3, the diode D3, the capacitor C5, the AND circuit 26, the resistance R4, the diode D4, the capacitor C6, and the buffer 27 are provided between the output terminal Q of the flip-flop 23 and the gate of the switching element Q2 in the control circuit 10 shown in FIG. 6. On the contrary, in the control circuit 10c shown in FIG. 13, these are provided between the output terminal Q of the flip-flop 23 and the gate of the switching element Q1.

Next, the operations of the voltage detecting circuit 12d and the control circuit 10c, which are configured as described above and shown in FIG. 13, will be described by referring to a timing chart of signals shown in FIG. 14.

First, when a voltage $V_{Q2ds}$ of the switching element Q2 starts down at time t1 and a voltage divided by the resistance R11 and the resistance R12 becomes equal to a reference voltage Vr or less, an output of the comparator 21, that is an output Ve at point e and an input level of the set terminal S of the flip-flop 23, becomes L level.

When an output of the flip-flop 23, that is an output Va at point a, becomes H level, the output Va is delayed by a time constant of the resistance R1 and the capacitor C3. The delayed output Va is output to the gate of the switching element Q2 as a gate signal $V_{Q2gs}$ of the switching element Q2 through the buffer 24 for waveform shaping. At this time, the capacitor C4 is charged by the output Va through the resistance R2, and a voltage of the capacitor C4, that is a voltage Vc at point c, is increased by the time constant of the resistance R2 and the capacitor C3 between time t1 and time t2.

In addition, H level of the output Va is reversed to L level in the inverter 25, and the capacitor C5 is rapidly charged by H level of the output Va through the diode D3 to be H level. Therefore, the output of the AND circuit 26 is in an L level state, and the output of the buffer 27 is also in an L level state. Therefore, the gate signal $V_{Q1gs}$ to the switching element Q1 is not output.

Next, when the voltage at point c reaches at Vrc at time t2, an output of the comparator 22, that is an output Vd at point d, becomes L level, and the output of the flip-flop 23 is reset to be reversed to L level. Then, the voltage of the capacitor C3 is rapidly discharged through the diode D1, and the output of the buffer 24 becomes L level. The gate signal $V_{Q2gs}$ to the switching element Q2 is not output, and the switching element Q2 is turned off.

That is, a period to be time t1 to time t2 changes according to the amplitude of the voltage Vrc. In addition, the period to be time t1 to time t2, that is, a period during which the switching element Q2 is turned on, is adjusted by a signal from the feedback circuit 5 so that an output voltage V0 can be controlled.

In addition, the voltage Vc of the capacitor C4 is rapidly discharged through the diode D2 to be L level. Therefore, the output of the comparator 22 is reversed from L level to H level.

When an output Va of the flip-flop 23 at point a becomes L level, the output of the inverter 25 becomes H level. Since the input of the AND circuit 26 also becomes H level by the voltage Vb of the charged capacitor C5, the output of the AND circuit 26 becomes H level. With this H level, the capacitor C6 is charged through the resistance R4. The gate signal $V_{Q1gs}$ is output to the switching element Q1 through the buffer 27 with slight delay for preventing malfunctioning. In addition, the voltage Vb of the capacitor C5 is gradually starts discharging through the resistance R3.

Next, when the voltage Vb of the capacitor C5 gradually decreases to be a threshold Vth (a threshold of the AND circuit 26)(time t3), the input of the AND circuit 26 becomes L level. The output of the AND circuit 26 is reversed to L level. Then, the voltage of the capacitor C6 is discharged through the diode D4, and the output of the buffer 27 becomes L level. Therefore, the gate signal $V_{Q1gs}$ is prevented from being output to the switching element Q1.

Figure 14:
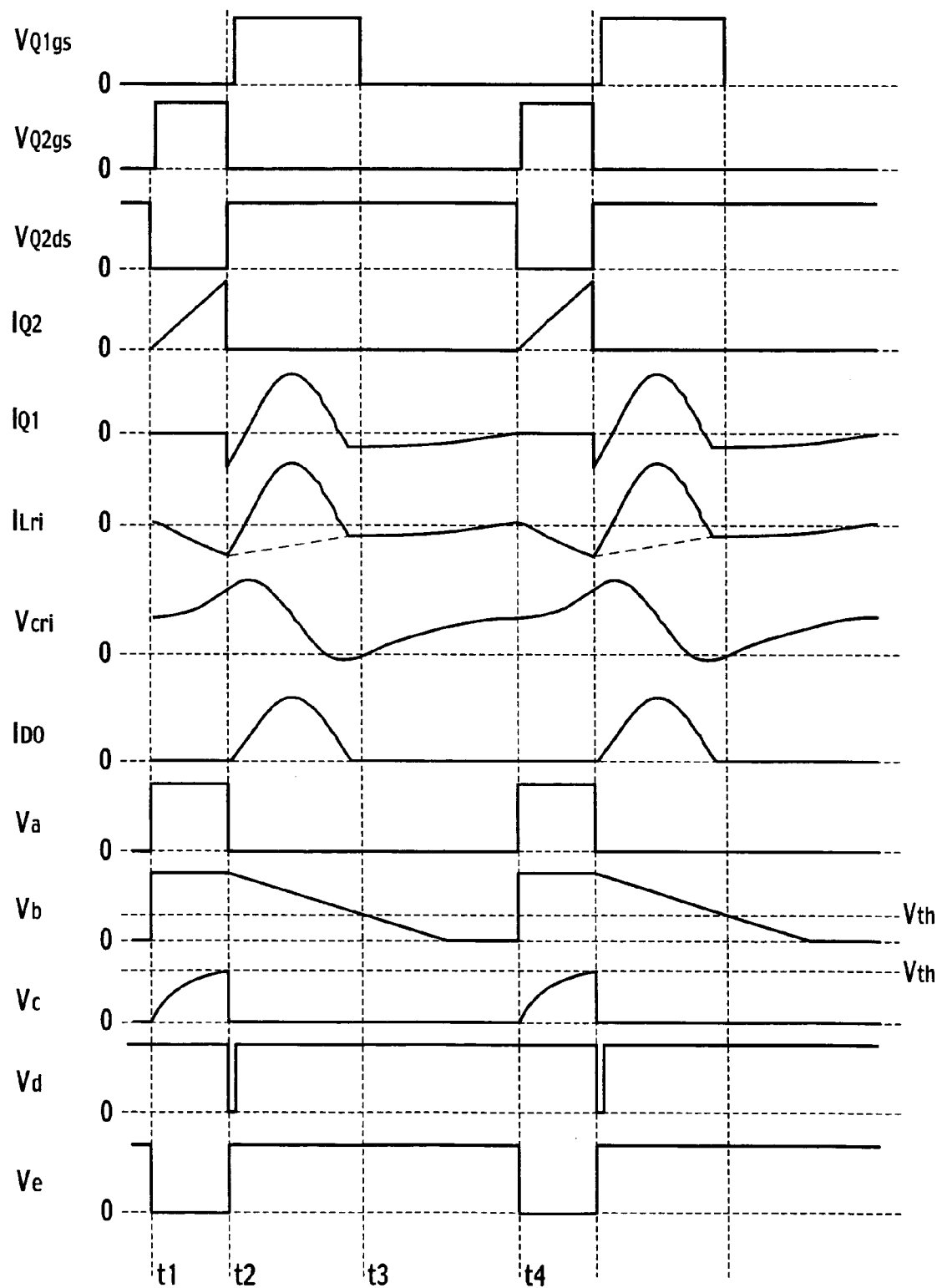
FIG. 14 is a timing chart of signals at each part of the switching power supply device according to the fourth embodiment of the present invention.

In the example shown in FIG. 14, the current $I_{Lri}$ flowing through the reactor Lr is a negative current even when the switching element Q1 is turned off at time t3. Therefore, the voltage $V_{Q2ds}$ of the switching element Q2 does not start down, and thus this state is maintained.

Next, at time t4, the current $I_{Lri}$ flowing through the reactor Lr becomes a positive current, and the voltage $V_{Q2ds}$ of the switching element Q2 starts down. Then, when the voltage divided by the resistance R11 and the resistance R12 becomes equal to a reference voltage Vr or less as a predetermined voltage, an output of the comparator 21, that is an output Ve at point e and an input level of the set terminal S of the flip-flop 23, becomes L level. Therefore, the operation at time t4 returns to an operation similar to the operation at time t1. The above described operations will be repeatedly carried out.

In this manner, according to the switching power supply device according of the fourth embodiment, the voltage detecting circuit 12d outputs a voltage detecting signal when the voltage at both ends of the switching element Q2 becomes equal to a predetermined voltage or less. The control circuit 10c turns on the switching element Q2 by the voltage detecting signal from the voltage detecting circuit 12d. Therefore, a short-circuit current can be prevented without being affected by the reverse recovery time of the body diode even when the state of resonance deviation is caused in the state of overloading.

Fifth Embodiment

Figure 15:
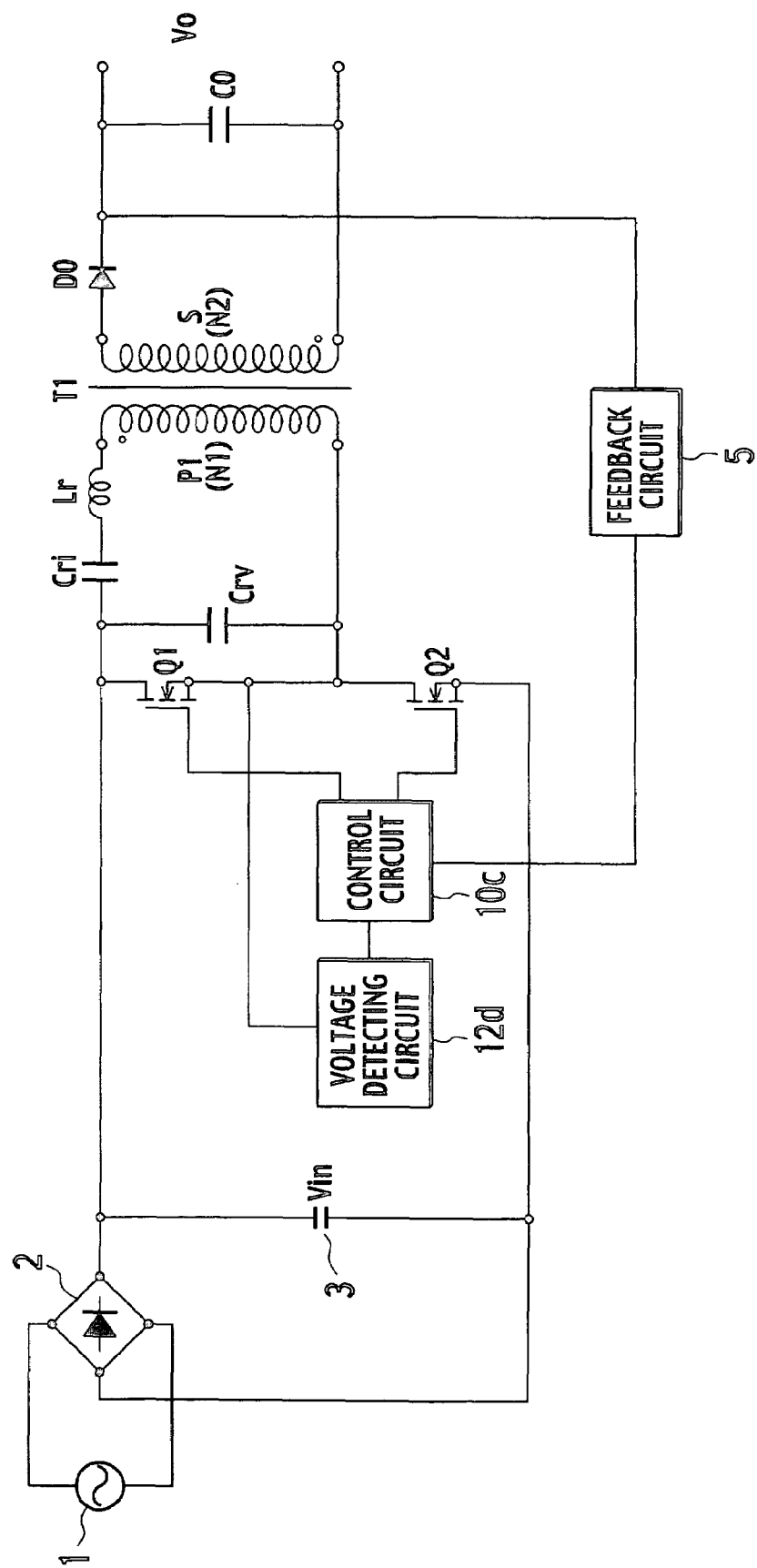
FIG. 15 is a circuit configuration diagram for showing a switching power supply device according to a fifth embodiment of the present invention.

FIG. 15 is a circuit configuration diagram for showing a switching power supply device according to a fifth embodiment of the present invention. In relation to the configuration of the switching power supply device of the first embodiment shown in FIG. 5, in the switching power supply device of the fifth embodiment shown in FIG. 15, a switching element Q1 is connected in parallel with a series resonant circuit consisting of a reactor Lr, a primary winding P1 (winding number N1) of a transformer T1, and a current resonant capacitor Cri and a voltage resonant capacitor Crv.

In addition, the primary winding P1 and a secondary winding S (winding number N2) of the transformer T1 are wound so as to generate a reverse phase voltage with respect to one another. A rectifying and smoothing circuit consisting of a rectifier D0 and a smoothing capacitor C0 is connected to the secondary winding S of the transformer T1.

In addition, a voltage detecting circuit 12d outputs a voltage detecting signal when a voltage at both ends of the switching element Q2, which is turned off at the time of transmitting energy to the secondary side of the transformer, becomes equal to a predetermined voltage or less. The control circuit 10c turns on the switching element Q2 by the voltage detecting signal from the voltage detecting circuit 12d.

The switching power supply device of the fifth embodiment as described above operates similarly to the operation of the switching power supply device of the fourth embodiment, and effects similar to the effects of the switching power supply device of the fourth embodiment can be obtained.

Sixth Embodiment

Figure 16:
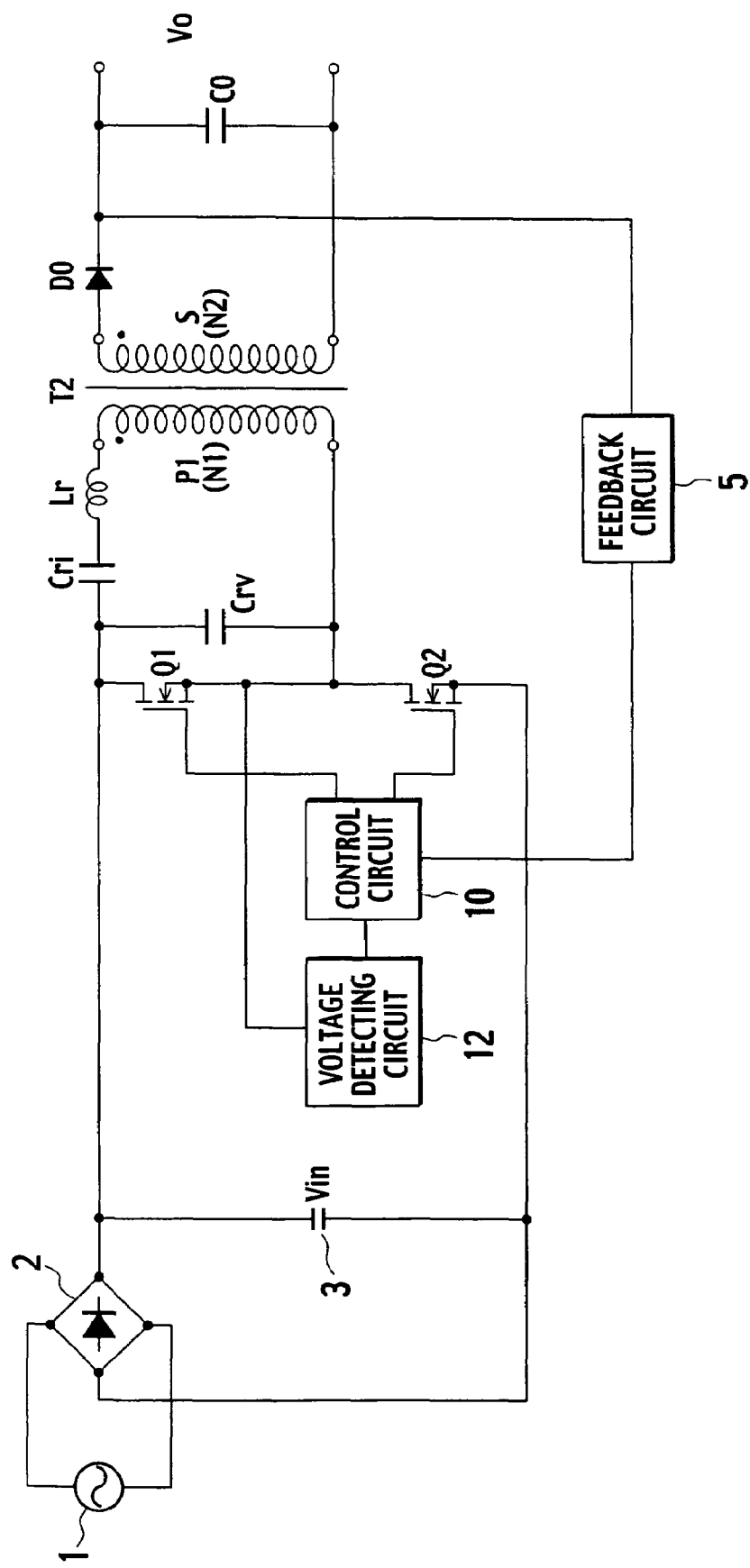
FIG. 16 is a circuit configuration diagram for showing a switching power supply device according to a sixth embodiment of the present invention.

FIG. 16 is a circuit configuration diagram for showing a switching power supply device according to a sixth embodiment of the present invention. In relation to the switching power supply device of the fourth embodiment shown in FIG. 12, in the switching power supply device of the sixth embodiment shown in FIG. 16, a switching element Q1 is connected in parallel with a series resonant circuit consisting of a reactor Lr, a primary winding P1 (winding number N1) of a transformer T2, and a current resonant capacitor Cri and a voltage resonant capacitor Crv.

In addition, the primary winding P1 and a secondary winding S (winding number N2) of the transformer T2 are wound so as to generate a common-mode voltage with respect to one another. A rectifying and smoothing circuit consisting of a rectifier D0 and a capacitor C0 is connected to the secondary winding S of the transformer T2.

In addition, a voltage detecting circuit 12 outputs a voltage detecting signal when a voltage at both ends of a switching element Q2, which is turned on at the time of transmitting energy to a secondary side of the transformer, becomes equal to a predetermined voltage or more. A control circuit 10 turns on a switching element Q1 by the voltage detecting signal from the voltage detecting circuit 12.

The switching power supply device of the sixth embodiment as described above operates similarly to the operation of the switching power supply device of the first embodiment, and effects similar to that of the switching power supply device of the first embodiment can be obtained.

Figure 17:
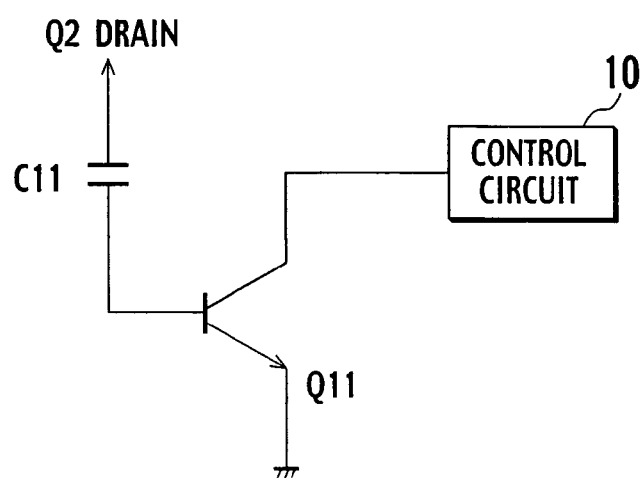
FIG. 17 is a diagram for showing another configuration example of a voltage detecting circuit.

FIG. 17 is a diagram for showing another configuration of a voltage detecting circuit. The voltage detecting circuit shown in FIG. 17 has a capacitor C11, whose one end is connected to a drain of the switching element Q2, and a transistor Q11. The other end of the capacitor C11 is connected to a base of the transistor Q11, a collector of the transistor Q11 is connected to the control circuit 10, and an emitter of the transistor Q11 is grounded. This voltage detecting circuit detects a change of a voltage between the drain and source of the switching element Q2 to output the detecting signal to the control circuit 10.

That is, the capacitor C11 is charged according to the drain voltage of the switching element Q2, and the transistor Q11 is turned on by a charge current of this capacitor C11 to output the detecting signal to the control circuit 10.

It should be noted that the present invention is not limited to the first to sixth embodiments. The present invention may be achieved in combination of any one of the fourth to sixth embodiments and the second embodiment or the third embodiment. That is, in the fourth and fifth embodiments, the control circuit may turn on the switching element Q2 after a predetermined period has passed since the switching element Q1 is turned off in the case where the voltage detecting signal from the voltage detecting circuit is absent when the switching element Q1, which is turned on at the time of transmitting energy to the secondary side of the transformer, is turned off.

In addition, in the sixth embodiment, the control circuit may turn on the switching element Q1 after a predetermined period has passed since the switching element Q2 is turned off in the case where the voltage detecting signal from the voltage detecting circuit is absent when the switching element Q2, which is turned on at the time of transmitting energy to the secondary side of the transformer, is turned off.

Moreover, in any of the forth to sixth embodiments, by providing the auxiliary winding P2 as shown in FIG. 11, the control circuit may change the predetermined period according to the output voltage detected in the auxiliary winding P2.

Furthermore, in the first to sixth embodiments, only one pair of the rectifier circuit D0 and smoothing circuit C0 is provided on the secondary side of the transformer, but two pairs or more of the rectifying and smoothing circuits may be provided.

Still furthermore, in the first to sixth embodiments, the alternating current power supply 1, the full-wave rectifier circuit 2, and the smoothing capacitor C3 are used. In place of these, a direct current power supply may be connected to both ends of a series circuit of the switching element Q1 and the switching element Q2.

The present invention can be applied to a switching power supply device such as a DC-DC converter and an AC-DC converter.

What is claimed is:

1. A switching power supply device, comprising:
   a series circuit in which a first switching element and a second switching element are connected in series at both ends of an output of an input rectifier circuit for rectifying an alternating voltage of an alternating current power supply or at both ends of a direct current power supply;
   a resonant circuit in which a primary winding of a transformer and a current resonant capacitor are connected in series at both ends of any one of the first switching element and the second switching element;
   at least one pair of rectifying and smoothing circuits for rectifying and smoothing a voltage generated across a secondary winding of the transformer during an on-period of any one of the first switching element and the second switching element;
   a control circuit for alternately turning on/off the first switching element and the second switching element based on a voltage from the at least one pair of the rectifying and smoothing circuits; and
   a voltage detecting circuit for outputting a voltage detecting signal when a voltage at both ends of one switching element of the first switching element and the second switching element, which is turned on at a time of transmitting electric power to the at least one pair of the rectifying and smoothing circuits, becomes equal to a predetermined voltage or more,
   wherein the control circuit turns on the other switching element of the first switching element and the second switching element based on the voltage detecting signal from the voltage detecting circuit.

2. The switching power supply device according to claim 1, wherein the voltage detecting circuit outputs a voltage detecting signal by detecting a change of the voltage at both ends of the one switching element.

3. The switching power supply device according to claim 1, wherein the control circuit turns on the other switching element after a predetermined period has passed since the one switching element is turned off in a case where the voltage detecting signal from the voltage detecting circuit is absent when the one switching element, which is turned on at the time of transmitting electric power to the at least one pair of the rectifying and smoothing circuits, is turned off.

4. A switching power supply device, comprising:
   a series circuit in which a first switching element and a second switching element are connected in series at both ends of an output of an input rectifier circuit for rectifying an alternating voltage of an alternating current power supply or at both ends of a direct current power supply;
   a resonant circuit in which a primary winding of a transformer and a current resonant capacitor are connected in series at both ends of any one of the first switching element and the second switching element;
   at least one pair of rectifying and smoothing circuits for rectifying and smoothing a voltage generated across a secondary winding of the transformer during an on-period of any one of the first switching element and the second switching element;
   a control circuit for alternately turning on/off the first switching element and the second switching element based on a voltage from the at least one pair of the rectifying and smoothing circuits; and
   a voltage detecting circuit for outputting a voltage detecting signal when a voltage at both ends of one switching element of the first switching element and the second switching element, which is turned off at a time of transmitting electric power to the at least one pair of the rectifying and smoothing circuits, becomes equal to a predetermined voltage or less,
   wherein the control circuit turns on the one switching element based on the voltage detecting signal from the voltage detecting circuit.

5. The switching power supply device according to claim 4, wherein the voltage detecting circuit outputs a voltage detecting signal by detecting a change of the voltage at both ends of the one switching element.

6. The switching power supply device according to claim 4, wherein the control circuit turns on the one switching element after a predetermined period has passed since the other switching element is turned off in a case where the voltage detecting signal from the voltage detecting circuit is absent when the other switching element of the first switching element and the second switching element, which is turned on at the time of transmitting electric power to the at least one pair of the rectifying and smoothing circuits, is turned off.

7. A switching power supply device, comprising:
   a series circuit in which a first switching element and a second switching element are connected in series at any one both ends of an output of an input rectifier circuit for rectifying an alternating voltage of an alternating current power supply or at both ends of a direct current power supply;
   a resonant circuit in which a primary winding of a transformer and a current resonant capacitor are connected in series at both ends of any one of the first switching element and the second switching element;
   at least one pair of rectifying and smoothing circuits for rectifying and smoothing a voltage generated across a secondary winding of the transformer during an on-period of any one of the first switching element and the second switching element;
   a control circuit for alternately turning on/off the first switching element and the second switching element based on a voltage from the at least one pair of the rectifying and smoothing circuits; and
   an output voltage detecting circuit for detecting an output voltage,
   wherein the control circuit turns on the other switching element of the first switching element and the second switching element after a predetermined period has passed since the one switching element is turned off in a case where the output voltage from the output voltage detecting circuit is equal to a predetermined voltage or less when the one switching element of the first switching element and the second switching element, which is turned on at a time of transmitting electric power to the at least one pair of the rectifying and smoothing circuits, is turned off, and changes the predetermined period according to the output voltage.

8. The switching power supply device according to claim 7, wherein the output voltage detecting circuit includes an auxiliary winding wound around the transformer, and outputs a voltage generated across the auxiliary winding to the control circuit as the output voltage.

* * * * *